United States Patent
Cho

(10) Patent No.: US 9,462,218 B2
(45) Date of Patent: Oct. 4, 2016

(54) VIDEO DISPLAY DEVICE AND METHOD OF DISPLAYING VIDEO

(71) Applicant: LG ELECTRONICS INC., Seoul (KR)

(72) Inventor: Eunhyung Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 98 days.

(21) Appl. No.: 13/721,767

(22) Filed: Dec. 20, 2012

(65) Prior Publication Data

US 2014/0140677 A1    May 22, 2014

(30) Foreign Application Priority Data

Nov. 19, 2012 (KR) .................... 10-2012-0130962

(51) Int. Cl.
*H04N 5/775* (2006.01)
*H04N 5/77* (2006.01)
*H04N 5/232* (2006.01)

(52) U.S. Cl.
CPC .......... *H04N 5/772* (2013.01); *H04N 5/23248* (2013.01)

(58) Field of Classification Search
CPC .................. H04N 7/0122; H04N 21/234363; H04N 9/7925
USPC ................................................. 386/230, 241
See application file for complete search history.

(56) References Cited

U.S. PATENT DOCUMENTS

| | | | |
|---|---|---|---|
| 7,386,190 B2 | 6/2008 | Lin et al. | |
| 2003/0117513 A1* | 6/2003 | Anderson | 348/333.11 |
| 2005/0168593 A1 | 8/2005 | Akizuki et al. | |
| 2005/0238328 A1* | 10/2005 | Morimoto et al. | 386/95 |
| 2007/0065039 A1 | 3/2007 | Park et al. | |
| 2007/0201833 A1* | 8/2007 | Cherna et al. | 386/95 |
| 2007/0260985 A1* | 11/2007 | Utagawa et al. | 715/721 |
| 2009/0040308 A1 | 2/2009 | Temovskiy | |
| 2009/0263108 A1* | 10/2009 | Mizuno | 386/109 |
| 2010/0295956 A1 | 11/2010 | Goto | |
| 2012/0174153 A1 | 7/2012 | Hung | |
| 2013/0128364 A1* | 5/2013 | Wheeler | A61B 3/113 359/630 |
| 2013/0322848 A1* | 12/2013 | Li | 386/241 |

FOREIGN PATENT DOCUMENTS

| | | |
|---|---|---|
| CN | 102595076 A | 7/2012 |
| JP | 2006-86870 A | 3/2006 |
| KR | 10-0686310 B1 | 2/2007 |
| WO | WO 2007/075071 A1 | 7/2007 |

* cited by examiner

*Primary Examiner* — Thai Tran
*Assistant Examiner* — Jose Mesa
(74) *Attorney, Agent, or Firm* — Birch, Stewart, Kolasch & Birch, LLP

(57) ABSTRACT

Discussed herein are a video display device and a method of displaying a video. The video display device includes a communication unit acquiring a video including rotation information, a display unit displaying the video, and a processor setting up a video playback mode, wherein the video playback mode may include a natural display mode displaying the acquired video without performing any rotation compensation based upon the rotation information, and a horizontal display mode displaying the acquired video performing the rotation compensation based upon the rotation information, and wherein, when the video playback mode corresponds to the horizontal display mode, the video display device performs the rotation compensation of a plurality of sequential frames of the video based upon the rotation information, and displays each of the sequential frames of the video cropped to a size.

17 Claims, 21 Drawing Sheets

VIDEO DISPLAY DEVICE AND METHOD OF DISPLAYING VIDEO

Pursuant to 35 U.S.C. §119(a), this application claims the benefit of the Korean Patent Application No. 10-2012-0130962, filed on Nov. 19, 2012, which is hereby incorporated by reference as if fully set forth herein.

BACKGROUND OF THE INVENTION

1. Field of the Invention

The present invention relates to a video display device and method of displaying a video and, most particularly, to a method of displaying a video including rotation information on a display device.

2. Discussion of the Related Art

With the evolution in the information technology, it has become common for individual users to record and view moving pictures by using their own digital devices. Accordingly, a user may be capable of viewing a video, which he/she has personally recorded, by using his/her own digital device. However, when the user personally performs recording, due to the shaking of the hand or arm of the user, the digital device may also be shaken during the recording of the video. Therefore, when playing back the recorded video, an instable viewing of the recorded image may be provided to the user due to the shaking of the screen of the digital device.

Meanwhile, when viewing the recorded image after refining the image by using an anti hand-shaking function, which is equipped in the digital device itself, it may be difficult for the user to feel and experience the tension or on-site sensation he/she has felt at the time of the recording. Moreover, as opposed to a professional user, when a common user performs the recording, it may be more difficult for the common user to refine the video. Therefore, when recording and viewing a video by using a digital device, an intuitive and simple method, which can simultaneously provide on-site sensation at the time of the recording and stability, is required.

SUMMARY OF THE INVENTION

Accordingly, the present invention is directed to a video display device and method of displaying a video that substantially obviate one or more problems due to limitations and disadvantages of the related art.

An object of the present invention is to provide a video display device and method of displaying a video that can allow the user to select as user any one of a natural display mode or a horizontal display mode, depending upon the user's preference, when the user wishes to view a video. At this point, an object of the present invention is to provide the user with experiencing vividly at the time of the recording of the selected video through the natural display mode. And, another object of the present invention is to provide the user with viewing stability when playing-back the selected moving picture through the horizontal display mode.

Another object of the present invention is to provide a video display device and method of displaying a video that can provide the user with a another video playback mode, through the user's input or automatic setting, while a selected video is being displayed by using at least one of the video playback modes. More specifically, while the selected video is being displayed in the natural display mode, an object of the present invention to provide the user with the horizontal display mode through the user's input or automatic setting. And, while the selected video is being displayed in the horizontal display mode, an object of the present invention to provide the user with the natural display mode through the user's input or automatic setting.

A further object of the present invention is to provide a video display device and method of displaying a video that can simply set-up the playback mode, when setting or re-setting the video playback mode.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, according to an embodiment of the present invention, a video display device displaying a recorded video includes a communication unit acquiring a video including rotation information, a display unit displaying the video, and a processor setting up a video playback mode, wherein the video playback mode may include a natural display mode displaying the acquired video without performing a rotation compensation based upon the rotation information, and a horizontal display mode displaying the acquired video performing the rotation compensation based upon the rotation information, wherein, when the video playback mode corresponds to the horizontal display mode, the video display device performs the rotation compensation of a plurality of sequential frames of the video based upon the rotation information, and displays each of the plurality of sequential frames of the video cropped to a size, and wherein a cropping size is decided based upon the rotation information of the plurality of sequential frames of the video.

According to another embodiment of the present invention, a method of displaying a recorded video includes a step of acquiring a video including rotation information, wherein the rotation information includes rotation angle information with respective to the plurality of frames of the video, a step of setting up a video playback mode, wherein the video playback mode may include a natural display mode displaying the acquired video without performing a rotation compensation based upon the rotation information, and a horizontal display mode displaying the acquired video performing the rotation compensation based upon the rotation information, and a step of displaying the video based upon the set video playback mode, wherein, when the video playback mode corresponds to the horizontal display mode, a plurality of sequential frames of the video is rotation-compensated based upon the rotation information, and each of the sequential frames of the video cropped to a single size, thereby being displayed, and wherein a cropping size is decided based upon the rotation information of the plurality of sequential frames of the video.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts. And, the scope and spirit of the present invention will not be limited only to the exemplary embodiments presented herein.

Although the terms used in the present invention are selected from generally known and used terms, the detailed meanings of which are described in relevant parts of the description herein. It should be noted that the terms used herein may vary depending upon the intentions or general practice of anyone skilled in the art and also depending upon the advent of a novel technology. Some of the terms mentioned in the description of the present invention have been selected by the applicant at his or her discretion, terms used herein. Furthermore, it is required that the present invention is understood, not simply by the actual terms used but by the meaning of each term lying within.

Figure 1:
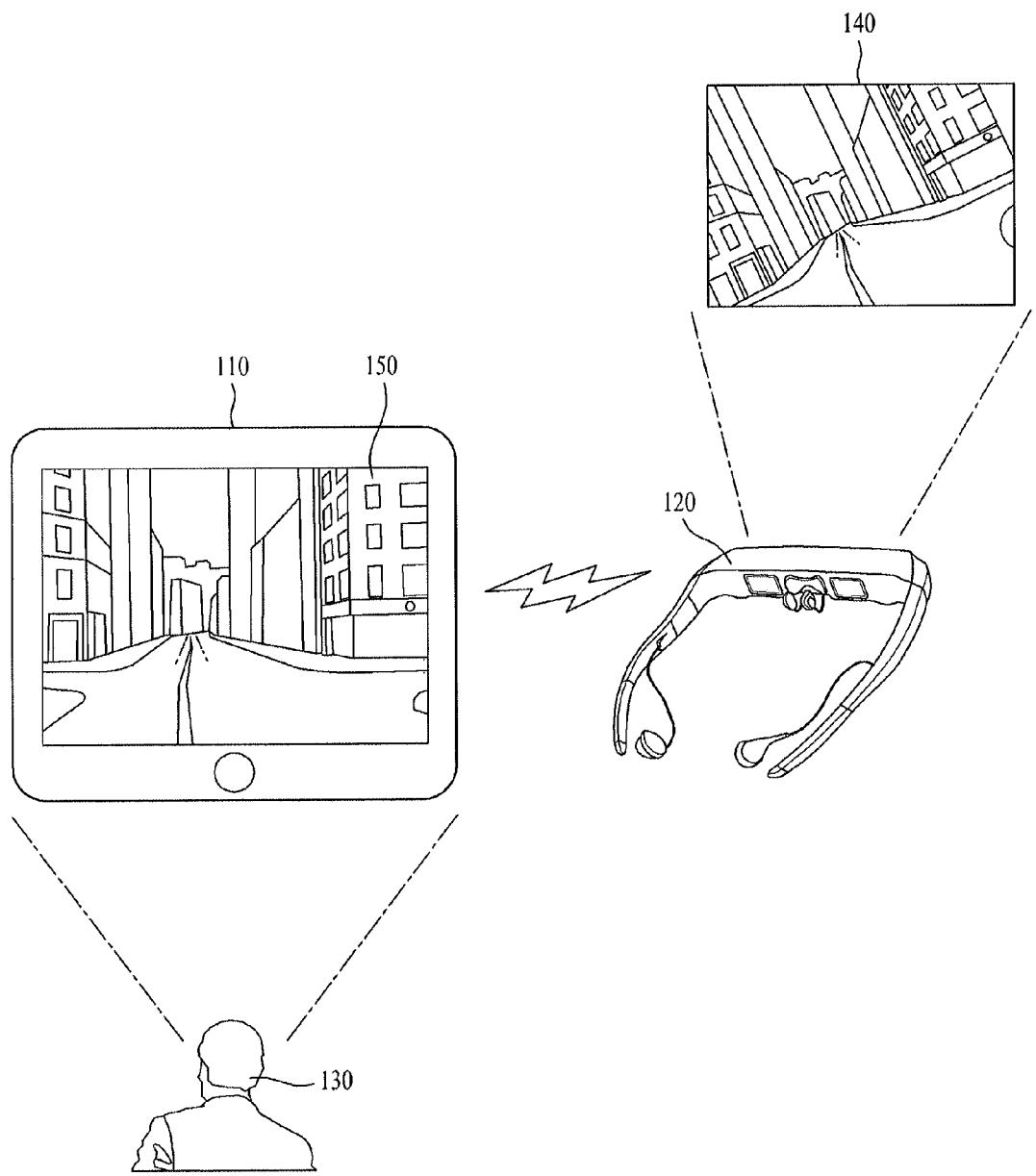
FIG. 1 illustrates an example of displaying a recorded video on a display device according to an embodiment of the present invention.

FIG. 1 illustrates an example of displaying a recorded video on a display device according to an embodiment of the present invention. According to the embodiment of the present invention, the display device 110 may display a video which is acquired from an external device 120 to a user 130.

The display device 110 may include various types of digital devices having data display and data communication functions, such as a personal computer (PC), a personal digital assistant (PDA), a laptop computer, a tablet PC, a television receiver, and so on. Referring to FIG. 1, depending upon the set up video playback mode, the display device 110 may process the recorded video, so as to display 150 the processed image. The display device 110 may display the processed image by compensating for a rotation respective to each frame of the recorded video. This will be described later on in more detail with reference to FIG. 4 to FIG. 11.

The external device 120 may include various types of digital devices capable of recording video. For example, the external device 120 may include a video recorder, a smart phone, a PC, a PDA, a notebook computer, a tablet PC, and so on. Additionally, the external device may further include other various types of digital devices that can record videos. In the example shown in FIG. 1, the external device 120 represents a head mounted display (HMD). Herein, the HMD 120 may include a camera (not shown), a communication unit (not shown), and a sensor unit (not shown). Herein, the sensor unit (not shown) includes a gravity sensor, a geomagnetic sensor, a gyro sensor, an acceleration sensor, an inclination sensor, and so on. The external device 120 may sense the rotation information of a plurality of frames included in the video through such sensor units. Additionally, the HMD 120 may record a video by using a camera (not shown), which is mounted on the HMD 120, and may transmit the recorded video to the display device 110 through the communication unit (not shown). Moreover, depending upon the object of the present invention, the above-described HMD 120 may be changed to or replaced with other diverse devices. For example, the HMD 120 according to the present invention may include a variety of devices that can be worn by the user so as to provide image display, such as an Eye Mounted Display (EMD), eyeglasses, eyepieces, eye wear, Head Worn Display (HWD), and so on.

Additionally, the external device 120 and the display device 110 may perform data reception and/or transmission to and from one another by using various forms of wired or wireless communication means. At this point, the available wireless communication means may include Near Field Communication (NFC), Zigbee, infrared communication, Bluetooth, Wi-Fi, and so on. And, the present invention will not be limited only to the wireless communication means listed above. Moreover, the external device 120 and the display device 110 may perform data transmission through a Universal Serial Port (USB). In the description of the present invention, the communication between the external device 120 and the display device 110 may be performed by using any one of the communication means listed above, or may be performed by using a combined form of at least two or more of the communication means listed above.

Referring to FIG. 1, the HMD 120 may perform recording of a video 140 while being worn by the user. In this case, since the HMD 120 is moved in accordance with the movement of the user, the video recorded through the HMD 120 may include rotation information. Herein, the movement of the user may include walking, tilting of the head, moving of the hands, and so on. Additionally, the rotation information may be included as metadata with respect to the video. For example, the rotation information may include rotation angle information with respective to each of a plurality of frames of the video. The rotation angle information may indicate an angle by which each frame is rotated with respect to a horizontal state. Herein, the horizontal state refers to a state of the displayed image forming a right angle with the direction of the earth's gravity. In other words, the horizontal state may include a state when the recorded image forms a rotation angle of 0° with the horizontal line or the horizon. The horizontal state may also include a state when the recorded image forms a rotation angle of 0° with the horizontal line or the horizon, which is recognized in the recorded image. Additionally, the rotation angle information may be measured by using the gravity sensor, the geomagnetic sensor, angle sensor, and so on, which are included in the external device 120. Furthermore, the rotation information may include recording time information with respective to each of the plurality of frames included in the video. The recording time information may indicate the recording time of each frame with respect to each of the plurality of frames included in the video, or the recording time information may indicate a time order of each frame among the plurality of frames included in the video. The HMD 120 may provide the video, which include the above-described rotation information, to the display unit 110.

As another example, the rotation information may include rotation information with respective to the entire video data. More specifically, based upon the recorded time flow of the video, the rotation information may include information on a change in the rotation angle of the corresponding frame. For example, when the running time of the video is 10 minutes, the rotation information may include information on the change in rotation angle for each of the plurality of frames corresponding to the 10-minute video. In this case, the display device 110 may match the frame of the video with the rotation information with respect to the time point of the corresponding frame, so as to determine the rotation angle of each frame.

Furthermore, referring to FIG. 1, the HMD 120 may have an view angle 140 having a predetermined range. The view angle 140 corresponds to a predetermined area corresponding to a visual field of the user wearing the HMD 120. And, the view angle 140 may include an area within a predetermined angular range along a forward direction of the HMD 120. Among the scenes shown in front of the HMD 120, the HMD 120 may record the scenes within the view angle 140. Additionally, the HMD 120 may provide the display unit 110 with a video, which is configured of the scenes within the range of the view angle 140.

Figure 2:
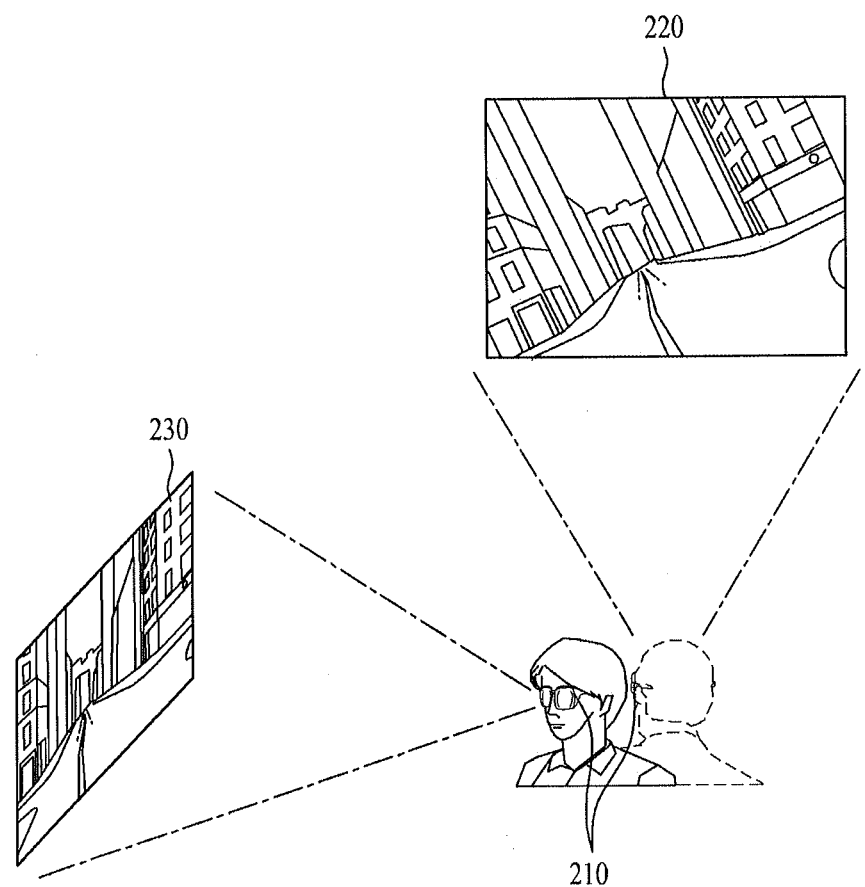
FIG. 2 illustrates another example of displaying a recorded video on a display device according to an embodiment of the present invention.

FIG. 2 illustrates another example of displaying a recorded video on a display device according to an embodiment of the present invention. More specifically, FIG. 2 illustrates an example of displaying a recorded video 220, which is recorded by using the HMD 210, through the HMD 210 according to the embodiment of the present invention.

Referring to FIG. 2, the user may record a video while wearing the HMD 210. At this point, as described above with reference to FIG. 1, the HMD 210 may move in accordance with the movement of the user, and the video recorded through the HMD 210 may include rotation information.

Additionally, the HMD 210 may include a camera (not shown), a processor (not shown), and a sensor unit (not shown). The HMD 210 may record a video within the view angle 220 through the camera (not shown), and the HMD 210 may process the recorded video in accordance with the video playback mode through the processor (not shown). Also, the HMD 210 may use the sensor unit (not shown), so as to set up the video playback mode. The sensor unit (not shown) will be described in more detail later on with reference to FIG. 16. Furthermore, the user may view the video, which is processed in accordance with the video playback mode, through the HMD 210 within the view angle 230. In this case, the user wearing the HMD 210 may view the video, which was recorded through the HMD 210 in the natural display mode or the horizontal display mode. The video, which is displayed within the view angle 230, may be displayed as the video directly recorded by the HMD 210, or the video recorded by the HMD 210 may be displayed after being rotation-compensated.

Figure 3:
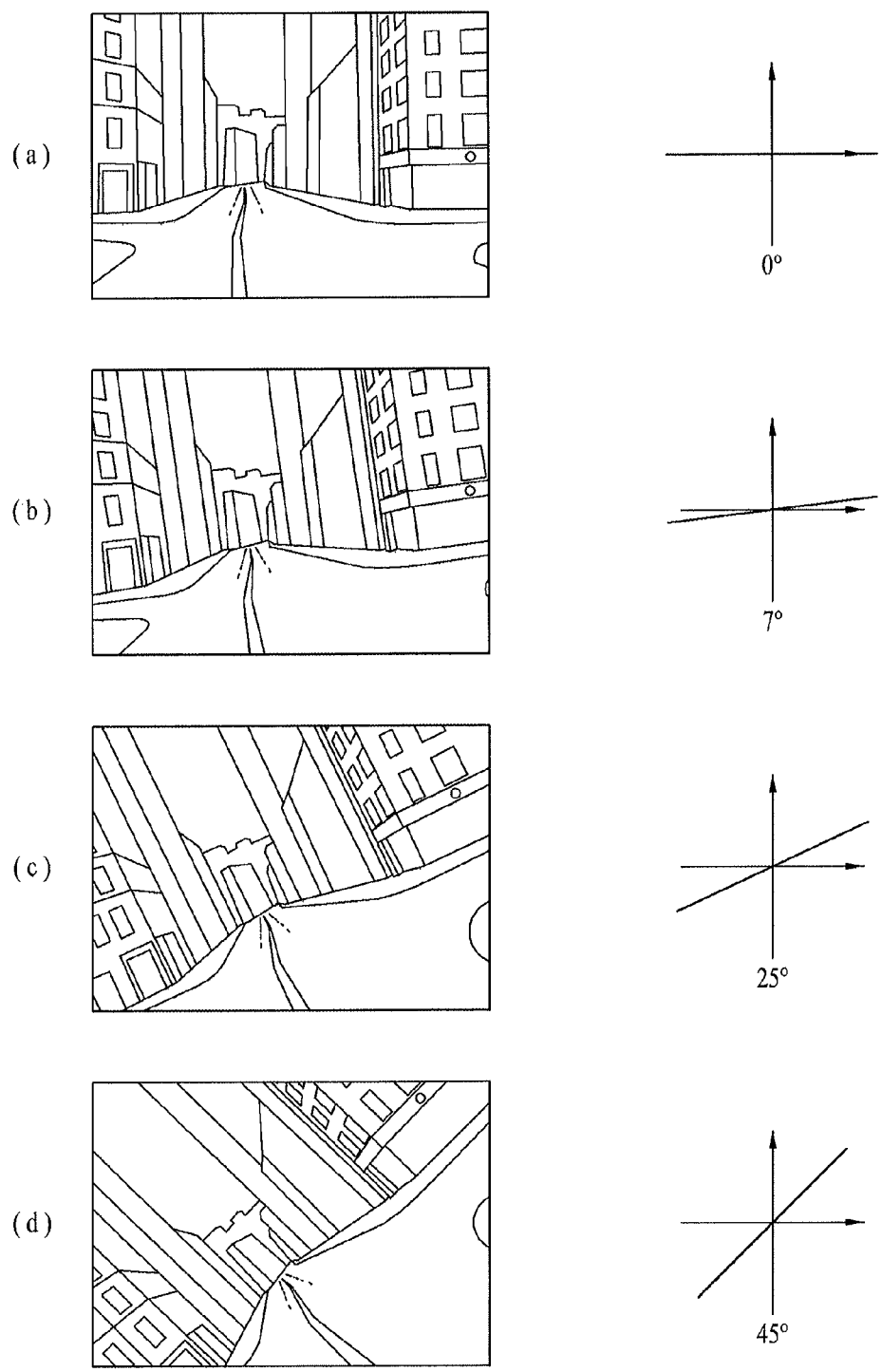
FIG. 3 illustrates exemplary frames respective to each rotation angle of the recorded video according to an exemplary embodiment of the present invention.

FIG. 3 illustrates exemplary frames with respective to each rotation angle of the recorded video according to an exemplary embodiment of the present invention. More specifically, FIG. 3 illustrates a portion of the plurality of frames configuring the recorded video. A video is configured of the plurality of frames and such frames may correspond to 30 frames, 60 frames, and so on. The frames shown in FIG. 3 may correspond to a part of the frames configuring the video, which is recorded by the HMD. Such frames correspond to frames recorded in accordance with a time sequence, and, as shown in FIG. 3, each of the acquired frames of the video may include the rotation angle information with respective to the horizontal state of each frame.

FIG. 3(*a*) illustrates an exemplary case when the rotation angle of a frame belonging to the acquired video is 0°. FIG. 3(*b*) illustrates an exemplary case when the rotation angle of the frame belonging to the acquired video is 7° to the left (i.e., counter clockwise). FIG. 3(*c*) illustrates an exemplary case when the rotation angle of the frame belonging to the acquired video is 25° to the left (i.e., counter clockwise). And, FIG. 3(*d*) illustrates an exemplary case when the rotation angle of the frame belonging to the acquired video is 45° to the left (i.e., counter clockwise). Additionally, the plurality of frames of the recorded video may have diverse rotation angles due to a variety of factors, such as the user's movement, e.g., the shaking of the hand at the time of the recording, the intensity of the wind, and so on.

The frames shown in FIG. 3 represents a part of the plurality of frames configuring the recorded video, and the display device may display such frames in a natural display mode, wherein the corresponding frames are displayed without being processed with rotation compensation, or may display such frames in a horizontal display mode, wherein the corresponding frames are displayed after being processed with rotation compensation. The natural display mode and the horizontal display mode will be described in more detail later on with reference to FIG. 4 to FIG. 11.

Figure 4:
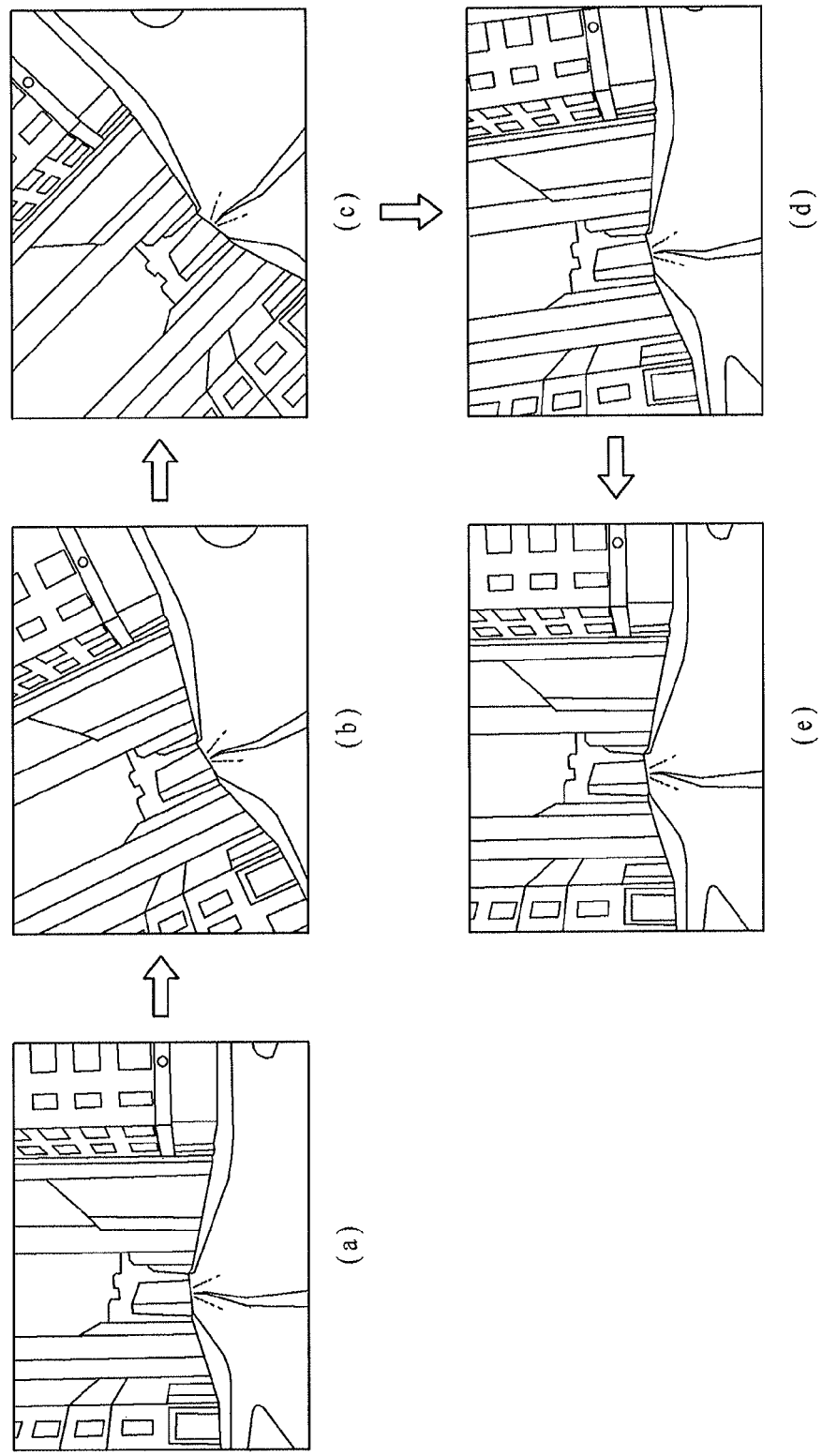
FIG. 4 illustrates an exemplary case of displaying the recorded video in a natural display mode according to an exemplary embodiment of the present invention.

FIG. 4 illustrates an exemplary case of displaying the recorded video in a natural display mode according to an exemplary embodiment of the present invention. As shown in FIG. 4, the video display device may display the video including the rotation information in the natural display mode, wherein the corresponding video is displayed without being processed with rotation compensation, which is based upon the rotation information. Accordingly, the frames shown in FIG. 4(a) to FIG. 4(e) may each correspond to a part of the plurality of frames configuring the recorded video. Additionally, the frames shown in FIG. 4(a) to FIG. 4(e) may correspond to frames that are recorded in accordance with a specific time sequence, and such frames may correspond to 30 frames, 60 frames, and so on.

In accordance with the time sequence, among the frames shown in FIG. 4, FIG. 4(a) may correspond to a frame being rotated by 0°, FIG. 4(b) may correspond to a frame being rotated by 25° to the left (i.e., counter clockwise), FIG. 4(c) may correspond to a frame being rotated by 45° to the left (i.e., counter clockwise), FIG. 4(d) may correspond to a frame being rotated by 7° to the left (i.e., counter clockwise), and FIG. 4(b) may correspond to a frame having a rotation angle of 0°.

As described above, when the video display device according to the present invention displays a video in the natural display mode, by viewing the shaking or rotation of the screen, the user may be capable of experiencing vividly at the time of the recording. Furthermore, when the video display device according to the present invention displays a video in the natural display mode, the frame may be displayed without being processed with any type of modification, such as cropping or resizing, and the recorded frame may be viewed without requiring to be zoomed-in.

Figure 5:
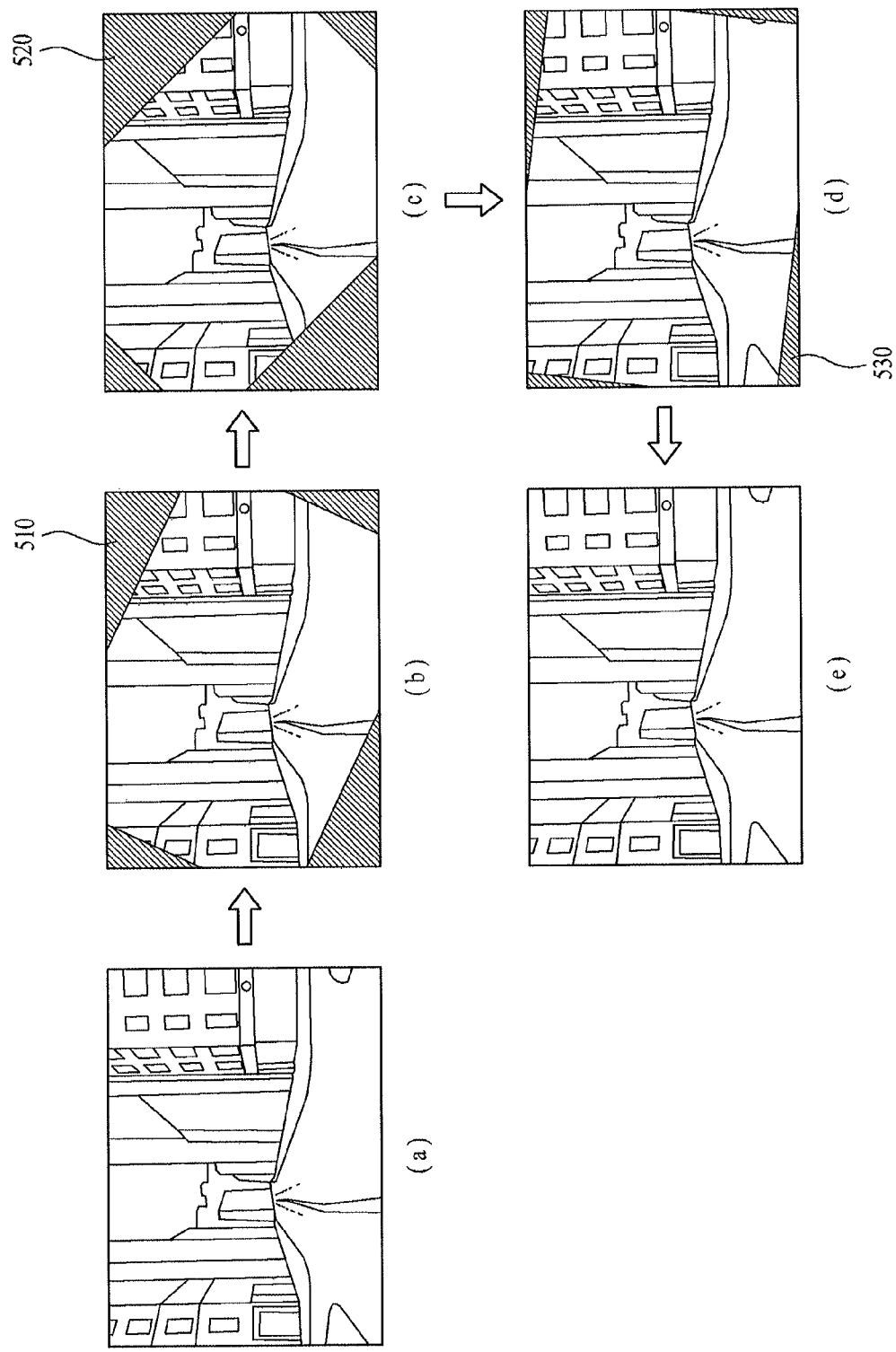
FIG. 5 illustrates a first exemplary case of displaying the recorded video in a horizontal display mode according to an embodiment of the present invention.
Figure 6:
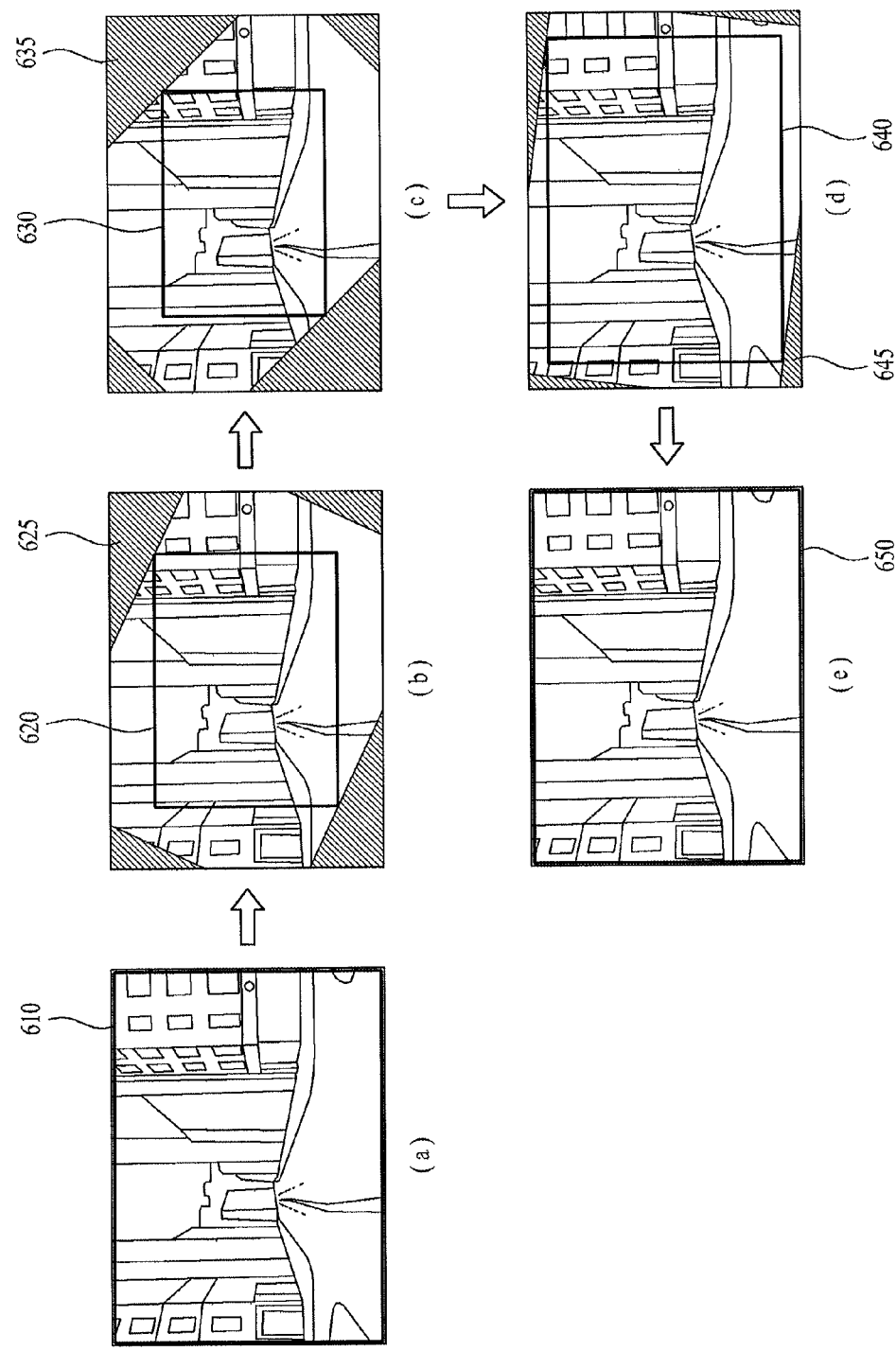
FIG. 6 illustrates a second exemplary case of displaying the recorded video in a horizontal display mode according to the embodiment of the present invention.
Figure 7:
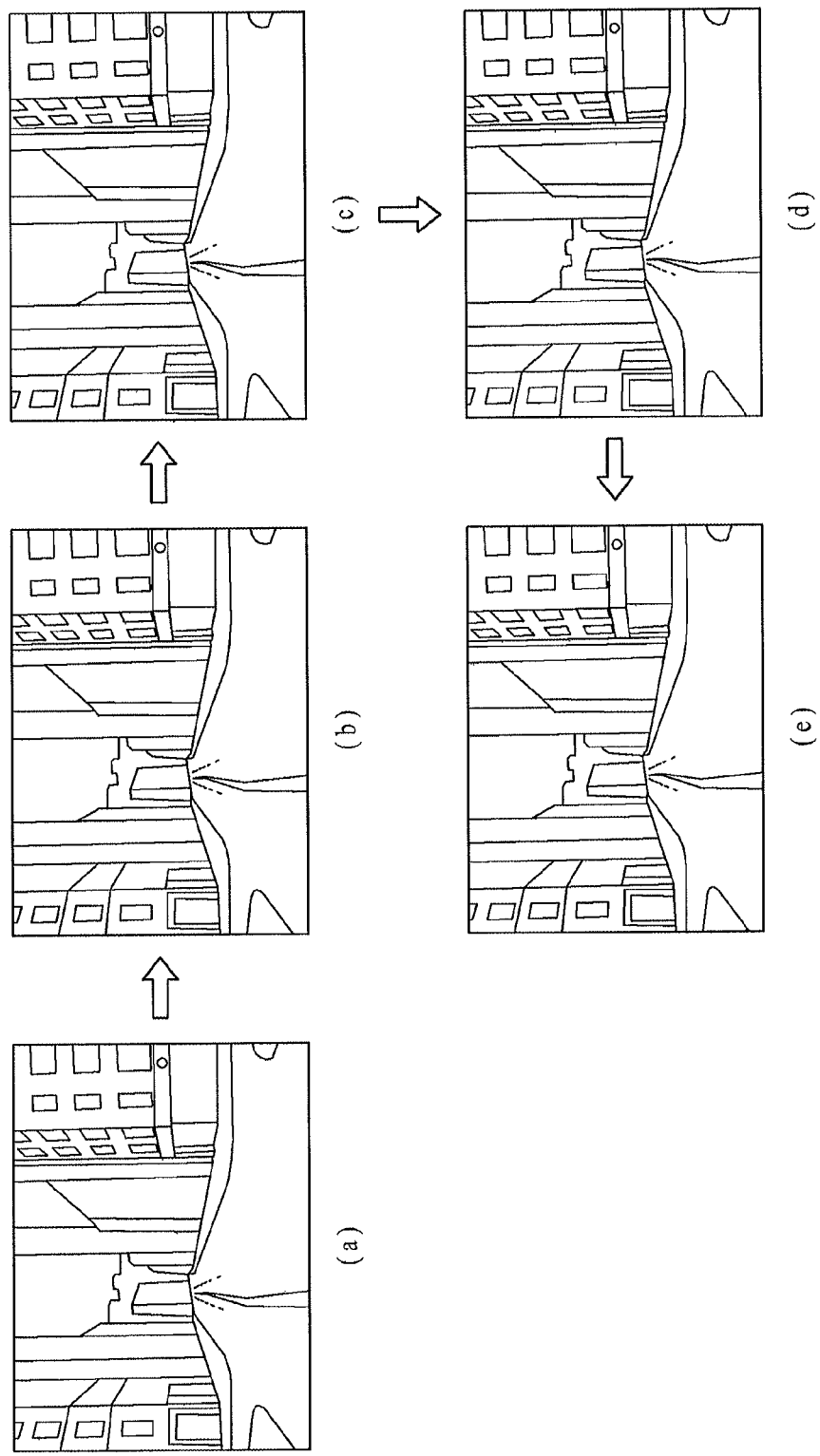
FIG. 7 illustrates a third exemplary case of displaying the recorded video in a horizontal display mode according to the embodiment of the present invention.

FIG. 5 to FIG. 7 illustrate exemplary cases of displaying the recorded video in the horizontal display mode according to the embodiment of the present invention. FIG. 5 illustrates frames that are rotation-compensated based upon the rotation information of each frame, in order to horizontally display the frames shown in FIG. 4. Referring to FIG. 5, the video display device according to the present invention performs rotation-compensation on each of the plurality of frames configuring the video, so that each frame can be horizontally displayed. At this point, the video display device may perform horizontal display by rotating each frame along the opposite direction of the actual rotation angle and as much as the actual rotation angle of the original image. For example, as shown in FIG. 5(a), based upon the rotation information indicating that the rotation angle of the frame shown in FIG. 4(a) is 0°, the video display device may not rotate the frame of FIG. 4(a). And, as shown in FIG. 5(b), based upon the rotation information indicating that the rotation angle of the frame shown in FIG. 4(b) is 25° to the left (i.e., counter clockwise), the video display device may rotate the frame of FIG. 4(b) by 25° to the right (i.e., clockwise). Also, as shown in FIG. 5(c), based upon the rotation information indicating that the rotation angle of the frame shown in FIG. 4(c) is 45° to the left (i.e., counter clockwise), the video display device may rotate the frame of FIG. 4(c) by 45° to the right (i.e., clockwise). And, as shown in FIG. 5(d), based upon the rotation information indicating that the rotation angle of the frame shown in FIG. 4(d) is 7° to the left (i.e., counter clockwise), the video display device may rotate the frame of FIG. 4(d) by 7° to the right (i.e., clockwise). Finally, as shown in FIG. 5(e), based upon the rotation information indicating that the rotation angle of the frame shown in FIG. 4(e) is 0°, the display device may not rotate the frame FIG. 4(e).

Meanwhile, referring to FIG. 5, as the frames corresponding to FIG. 5(b), FIG. 5(c), and FIG. 5(d) are rotated for the horizontal display, each of the corresponding frames may include a background region. As the frame is rotated, the background region may correspond to a region where the video is not displayed within the frame. The background region may be shown when the frame has a rectangular shape, and the background region may not be shown when the frame has a circular shape. The shape and size of the frame may be decided in accordance with the size of the frame that playbacks the video. Alternatively, the shape and size of the frame may also be decided in accordance with an image acquisition region of a recording sensor, which records the image. Each background region may be indicated as a hatched area 510, 520, and 530 shown in FIG. 5(b) to FIG. 5(d). Additionally, the occupation ratio of the background region within each frame may vary depending upon the rotation angle information of the corresponding frame. When the horizontally displayed frames of FIG. 5 are displayed on the display device without modification, the background region may also be displayed without modification. Due to the display of the background region, the user may experience discomfort while viewing the recorded video. In order to resolve this problem, a method of controlling the background region will hereinafter be described in detail with reference to FIG. 6 to FIG. 8.

FIG. 6 illustrates an example of setting up a crop area respective to each of the rotation-compensated frames shown in FIG. 5. Herein, a crop area refers to an area corresponding to a specific recorded scene, which is request to be maintained in the frame. In other words, within the recorded scene, areas that are determined as unnecessary areas are removed, and the remaining area may be referred to as the crop area. The crop area may be a necessary area that is required for controlling the background region shown in FIG. 5 in order to display the recorded video in the horizontal display mode.

For example, the crop area may be displayed as a rectangular area having an identical aspect ratio as the aspect ratio of the original frame. Accordingly, if the aspect ratio of the initial frame is equal to 5:5, the aspect ratio of the crop area may also correspond to 5:5. Referring to FIG. 6, since the aspect ratio of each frame shown in FIG. 6 is equal to approximately 6:4, the aspect ratio of the crop area of each frame shown in FIG. 6 may also correspond to approximately 6:4. According to the embodiment of the present invention shown in FIG. 6, in FIG. 6(a), since the frame does not include a background region, the crop area 610 may be identical to the original frame. In FIG. 6(b), the crop area 620 may be set up to have a rectangular shape having the aspect ratio of 6:4 and not including a background region 625. And, in FIG. 6(c), the crop area 630 may be set up to have a rectangular shape having the aspect ratio of 6:4 and not including a background region 635. Also, in FIG. 6(d), the crop area 640 may be set up to have a rectangular shape having the aspect ratio of 6:4 and not including a background region 645. Finally, in FIG. 6(e), since the frame does not include a background region, the crop area 650 may be identical to the original frame.

Meanwhile, the video display device may set up the cropping size for each of the multiple frames of the video to a size. This is to provide a more natural display of sequential frames when the video is being displayed. For example, based upon the rotation information of each of the multiple frames configuring the video, the cropping size may be decided in accordance with a frame wherein the crop area is substantially set to have a minimum size. Herein, the frame, wherein the crop area is substantially set to have a minimum size, may correspond to a frame having a cropped area, which is substantially set to have a maximum size, in order to perform the horizontal display of the corresponding frame, among the multiple frames, based upon the rotation angle information. This is to prevent the background region from being displayed to the user during the display of the video. For example, in a frame having an aspect ratio of 6:4, the crop area may substantially be set to have a minimum size at the rotating angle of 45°. And, in another example, in a frame having an aspect ratio of 5:5, the crop area may substantially be set to have a minimum size at the rotating angle of 45°. Additionally, during the cropping procedure, the display device may be capable of determining the rotation angle corresponding to the crop area substantially having the maximum size according to the aspect ratio of the corresponding frame, using the rotation information. Referring to FIG. 6, when the frames shown in FIG. 6 are set to have an aspect ratio of approximately 6:4, among the frames shown in FIG. 6(a) to FIG. 6(e), the crop area 630 of the frame shown in FIG. 6(c) may correspond to the crop area substantially having the minimum size. Accordingly, the cropping size of the other frames shown in FIG. 6 may be decided based upon the crop area 630 of FIG. 6(c). In other words, the frames shown in FIG. 6 may be cropped based upon the cropping size of FIG. 6(c).

Meanwhile, with the exception for at least one frame having a substantially minimum crop area among the multiple frames configuring the video, the cropping size may be decided based upon the frame having a substantially minimum crop area with respective to the rotation compensation among the remaining frames. Accordingly, referring to FIG. 6, among the frames shown in FIG. 6, the frame shown in FIG. 6(c) corresponds to the frame having a substantially maximum cropped area. And, with the exception for FIG. 6(c), the video may be displayed in the horizontal display mode. In this case, among the remaining frames of FIG. 6, the frame shown in FIG. 6(b) may correspond to the frame having the substantially minimum crop area with respective to the rotation compensation. Therefore, the cropping size of the frames shown in FIG. 6 may be decided based upon the crop area 620 of the frame shown in FIG. 6(b). Accordingly, the frames shown in FIG. 6, excluding FIG. 6(c), may be cropped based upon the cropping size of FIG. 6(b). Among the multiple frames of the video, with the exception for the frame that is recorded at an exceptionally large rotation angle, during the recording of the corresponding video, the remaining frames are shifted to the horizontal display mode, so that the video display device can more naturally display the video in the horizontal display mode. Additionally, when the user directly records the video, the frame may be rotated within a similar rotation angle range. When the rotation of a particular frame exceeds the predetermined rotation angle range, the corresponding frame may be considered as a frame with wrong recording. And, therefore, excluding such frame may provide a more natural display of the video.

FIG. 7 illustrates an example of cropping each frame in accordance with the crop area shown in FIG. 6 and resizing the cropped frames to a size identical to that of the original frame.

For example, the video display device may resize the cropped frames to fit the size of the original frame, and may then combine the resized frames, so as to display the video. Referring to FIG. 7, the frames shown in FIG. 7 may represent frames shown in FIG. 6, which are cropped to have the same size as the cropping size of the frame shown in FIG. 6(c), being resized to the same ratio as the frame shown in FIG. 6(c). Accordingly, the frames shown in FIG. 7 may correspond to frames being zoomed-in to the same ratio as the cropped frames of FIG. 6. More specifically, in the horizontal display mode, the video display device may display the frame, which playback in the natural video display mode, by zooming further into the corresponding frame. This is because each of the plurality frames can be displayed after being rotation compensated and cropped. In the horizontal display mode, the video display device may display an icon indicating the rotation information, so that the user can recognize the original video or be informed of the rotation angle of the original video frame. This will be described in more detail later on with reference to FIG. 14 and FIG. 15.

Accordingly, by viewing the video in the horizontal display mode, the user may be capable of viewing a video frame, which includes a rotation angle occurring at the time of the recording, in a horizontal state without experiencing the rotation angle. And, therefore, the user may view the video with more visual stability.

Figure 8:
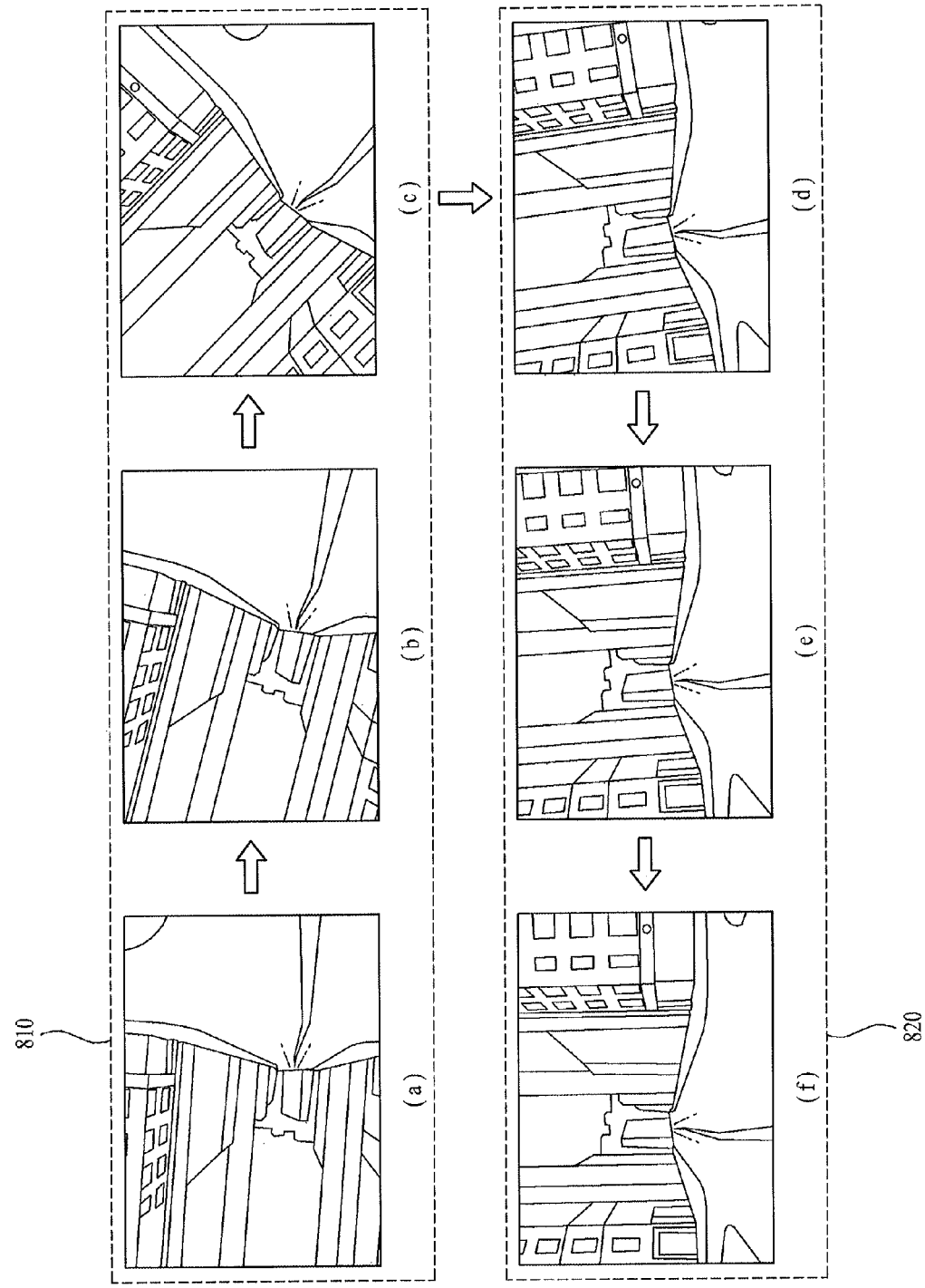
FIG. 8 illustrates a fourth exemplary case of displaying the recorded video in a horizontal display mode according to the embodiment of the present invention.

FIG. 8 to FIG. 11 illustrate other exemplary cases of displaying the recorded video in a horizontal display mode according to the embodiment of the present invention. More specifically, the video display device may divide the multiple frames of the video into a plurality of groups based upon a predetermined standard, and the video display device may set up a different video display mode for each group. For example, FIG. 8 illustrates a case of determining a frame group in accordance with a predetermined angle and horizontally displaying each frame group, when the display mode is set to the horizontal display mode, and when the angle of each frame belonging to the recorded video is largely different from one another.

First of all, referring to FIG. 8, FIG. 8(a) may illustrate a frame being rotated by 85° to the left (i.e., counter clockwise), FIG. 8(b) may illustrate a frame being rotated by 75° to the left (i.e., counter clockwise), FIG. 8(c) may illustrate a frame being rotated by 45° to the left (i.e., counter clockwise), FIG. 8(d) may illustrate a frame being rotated by 7° to the left (i.e., counter clockwise), FIG. 8(e) may illustrate a frame being rotated by 3° to the left (i.e., counter clockwise), and FIG. 8(f) may illustrate a frame being rotated by 0°. Moreover, the frames shown in FIG. 8(a) to FIG. 8(f) may correspond to a part of the plurality of frames, which configure the recorded video, and such frames may correspond to frames being displayed by a specific time sequence.

Among the frames configuring the video, when the frames being rotated by the same angle as the predetermined rotation angle, or by an angle exceeding the predetermined rotation angle range are sequential to one another, the video display device may set up the sequential frames as a frame group (hereinafter referred to as 'Group A') 810. Additionally, among the frames configuring the video, when the frames being rotated by an angle do not exceeding the predetermined rotation angle range are sequential to one another, the video display device may set up an another frame group (hereinafter referred to as 'Group B') 820. Herein, Group A 810 and Group B 820 may correspond to frames being recorded by a time sequence.

Referring to FIG. 8, the frames shown in FIG. 8(a), FIG. 8(b), and FIG. 8(c) may correspond to Group A 810, and the frames shown in FIG. 8(d), FIG. 8(e), and FIG. 8(f) may correspond to Group B 820. In this case, the predetermined rotation angle, which acts as the standard for determining the frame groups, may correspond to 45°.

In another example, based upon a changing point of a scene in the plurality of frames, the video display device may group the corresponding frames to a plurality of groups. Herein, the changing point of the scene may be determined based upon a change in status before and after the frames. The change in status before and after the frames may include a change in color alignment within the frames. For example, the video display device may decide the changing point of a scene based upon a video frame corresponding to a point when the video display device determines that a scene has been completely changed, such as a fade in or fade out effect. The fade out effect corresponds to a change in the scene during which the image becomes darker, and the fade in effect corresponds to a change in the scene during which the image becomes brighter. Additionally, in another example, the video display device may decide the changing point of a scene based upon a case when a black or white blank frame is displayed during the display of the video. Therefore, when a black or white blank frame is displayed during the display of the video, the video display device may group the frames placed before and after the black or white blank frame as a single group.

Figure 9:
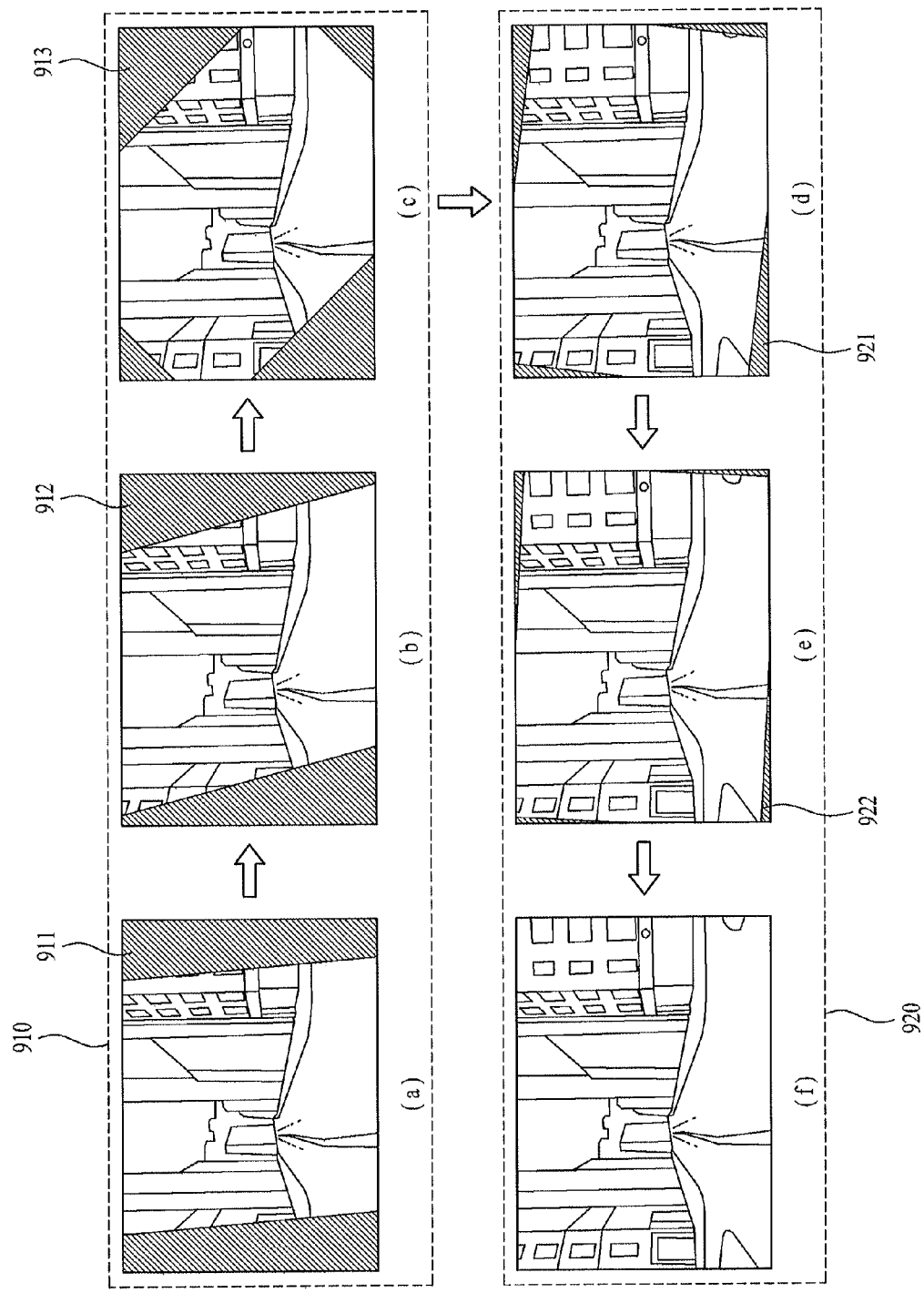
FIG. 9 illustrates a fifth exemplary case of displaying the recorded video in a horizontal display mode according to the embodiment of the present invention.

FIG. 9 illustrates an example of performing rotation compensation on each of the frames shown in FIG. 8 for the horizontal display according to the embodiment of the present invention.

Referring to FIG. 9, the frames shown in FIG. 9(a), FIG. 9(b), and FIG. 9(c) may correspond to Group A 910, and the frames shown in FIG. 9(d), FIG. 9(e), and FIG. 9(f) may correspond to Group B 920. More specifically, as described above with reference to FIG. 8, Group A 910 may correspond to a group of frames being rotated by the predetermined rotation angle or exceeding the predetermined rotation angle. And, Group B 920 may correspond to a group of frames that do not exceed the predetermined rotation angle. As shown in FIG. 9(a), based upon the rotation information indicating that the rotation angle of the frame shown in FIG. 8(a) corresponds to 85° to the left (i.e., counter clockwise), the video display device may rotate the frame shown in FIG. 8(a) by 85° to the right (i.e., clockwise) for the horizontal display. Also, as shown in FIG. 9(b), based upon the rotation information indicating that the rotation angle of the frame shown in FIG. 8(b) corresponds to 75° to the left (i.e., counter clockwise), the video display device may rotate the frame shown in FIG. 8(b) by 75° to the right (i.e., clockwise) for the horizontal display. Additionally, as shown in FIG. 9(c), based upon the rotation information indicating that the rotation angle of the frame shown in FIG. 8(c) corresponds to 45° to the left (i.e., counter clockwise), the video display device may rotate the frame shown in FIG. 8(c) by 45° to the right (i.e., clockwise) for the horizontal display. And, shown in FIG. 9(d), based upon the rotation information indicating that the rotation angle of the frame shown in FIG. 8(d) corresponds to 7° to the left (i.e., counter clockwise), the video display device may rotate the frame shown in FIG. 8(d) by 7° to the right (i.e., clockwise) for the horizontal display. Moreover, as shown in FIG. 9(e), based upon the rotation information indicating that the rotation angle of the frame shown in FIG. 8(e) corresponds to 3° to the left (i.e., counter clockwise), the video display device may rotate the frame shown in FIG. 8(e) by 3° to the right (i.e., clockwise) for the horizontal display. Finally, as shown in FIG. 9(f), based upon the rotation information indicating that the rotation angle of the frame shown in FIG. 8(f) corresponds to 0°, the video display device may not rotate the frame shown in FIG. 8(f).

Additionally, as shown in FIG. 9, as each of the frames shown in FIG. 9(a) to FIG. 9(f) is rotated for the horizontal display, a background region which is not displayed within the frame may occur. Herein, the background region may be indicated as the hatched areas 911, 912, 913, 921, and 922 within the frames shown in FIG. 9(a) to FIG. 9(e). In the horizontal display mode, when the video is displayed after being processed only with rotation compensation based upon the rotation angle respective to each of the frames shown in FIG. 9(a) to FIG. 9(f), the user may have difficulty in concentrating on the display video due to the background region. In order to resolve this problem, the controlling of the background region is required, which will be hereinafter described in more detail with reference to FIG. 10 and FIG. 11.

Figure 10:
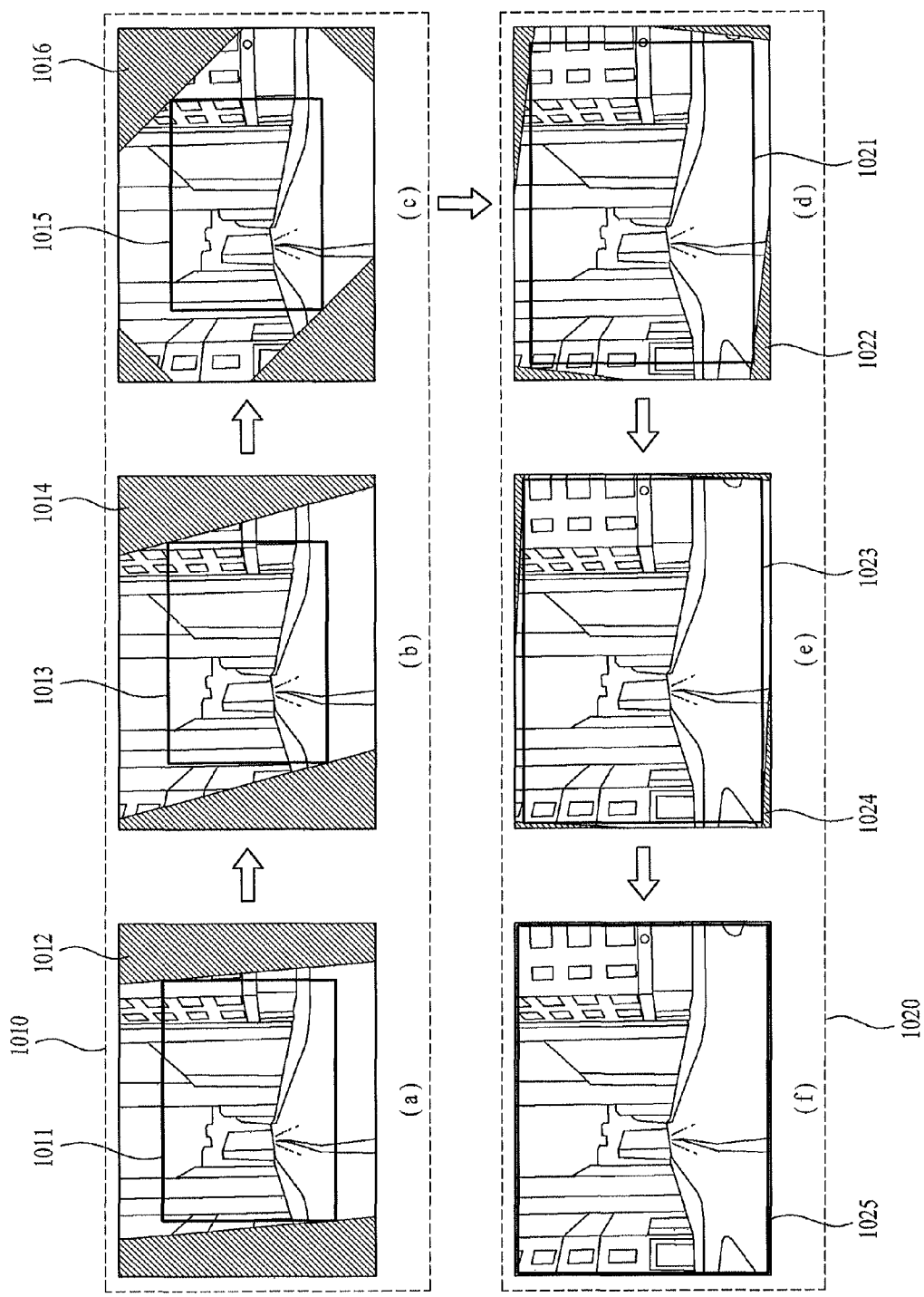
FIG. 10 illustrates a sixth exemplary case of displaying the recorded video in a horizontal display mode according to the embodiment of the present invention.

FIG. 10 illustrates an example of determining a crop area for each frame group, wherein the frame group is grouped in FIG. 8 and rotation compensated in FIG. 9, according to the embodiment of the present invention.

Among the plurality of frames configuring the video, the video display device may crop the frames being rotated by the predetermined rotation angle or exceeding the predetermined rotation angle (i.e., Group A) to a first size. Also, among the plurality of frames configuring the video, the video display device may crop the frames that do not exceed the predetermined rotation angle (i.e., Group B) to a second size. For example, each of the first size and the second size can be a size which the crop area according to the rotation compensation substantially becomes a minimum size. When the plurality of frames are cropped based upon the crop area corresponding to the crop size substantially having the minimum size, the background region of each frame may be removed. The crop area may indicate an area within the frame that is to be maintained in the recorded scene.

Referring to FIG. 10, FIG. 10(a), FIG. 10(b), and FIG. 10(c) may correspond to Group A 1010. And, in case of Group A 1010, as compared to the crop area 1011 of FIG. 10(a) and the crop area 1013 of FIG. 10(b), the size of the crop area 1015 of FIG. 10(c) may be substantially minimum size. Accordingly, as compared to the cropped area of FIG. 10(a) and the cropped area of FIG. 10(b), the cropped area of FIG. 10(c) may be substantially maximum size. With respect to Group A 1010, the video display device may crop the remaining frames based upon the crop area 1015 of the frame shown in FIG. 10(c). When cropping the remaining frames based upon the crop area 1015 of the frame shown in FIG. 10(c), the video display device may display the frames after removing the background region 1012, 1014, and 1016 included in each frame of Group A 1010. Additionally, the crop area 1015 of FIG. 10(c) may be cropped in a rectangular shape having an aspect ratio identical to the aspect ratio of the original video frame, which corresponds to 6:4. Accordingly, the frames shown in FIG. 10(a) and FIG. 10(b) may also be cropped in rectangular shapes each having an aspect ratio identical to that of the crop area of the frame shown in FIG. 10(c).

Moreover, referring to FIG. 10, FIG. 10(d), FIG. 10(e), and FIG. 10(f) may correspond to Group B 1020. And, in case of Group B 1020, as compared to the crop area 1023 of FIG. 10(e) and the crop area 1025 of FIG. 10(f), the size of the crop area 1021 of FIG. 10(d) may be substantially minimum size. Accordingly, as compared to the cropped area of FIG. 10(e) and the cropped area of FIG. 10(f), the cropped area of FIG. 10(d) may substantially correspond to the maximum size. With respect to Group B 1020, the video display device may crop the remaining frames based upon the crop area 1021 of the frame shown in FIG. 10(*d*). When cropping the remaining frames based upon the crop area 1021 of the frame shown in FIG. 10(*d*), the display device may display the frames after removing the background region 1022 and 1024 included in each frame of Group B 1020. Additionally, the crop area 1021 of FIG. 10(*d*) may be cropped in a rectangular shape having an aspect ratio identical to the aspect ratio of the original video frame, which corresponds to 6:4. Accordingly, the frames shown in FIG. 10(*e*) and FIG. 10(*f*) may also be cropped in rectangular shapes each having an aspect ratio identical to that of the crop area of the frame shown in FIG. 10(*d*).

Meanwhile, as shown in FIG. 10, the cropping size of Group A 1010 may be relatively smaller than the cropping size of Group B 1020. Since the rotation angle of the frames belonging to Group A 1010 is greater than the rotation angle of the frames belonging to Group B 1020, the ratio of the background area being cropped from the original frame may become greater.

Figure 11:
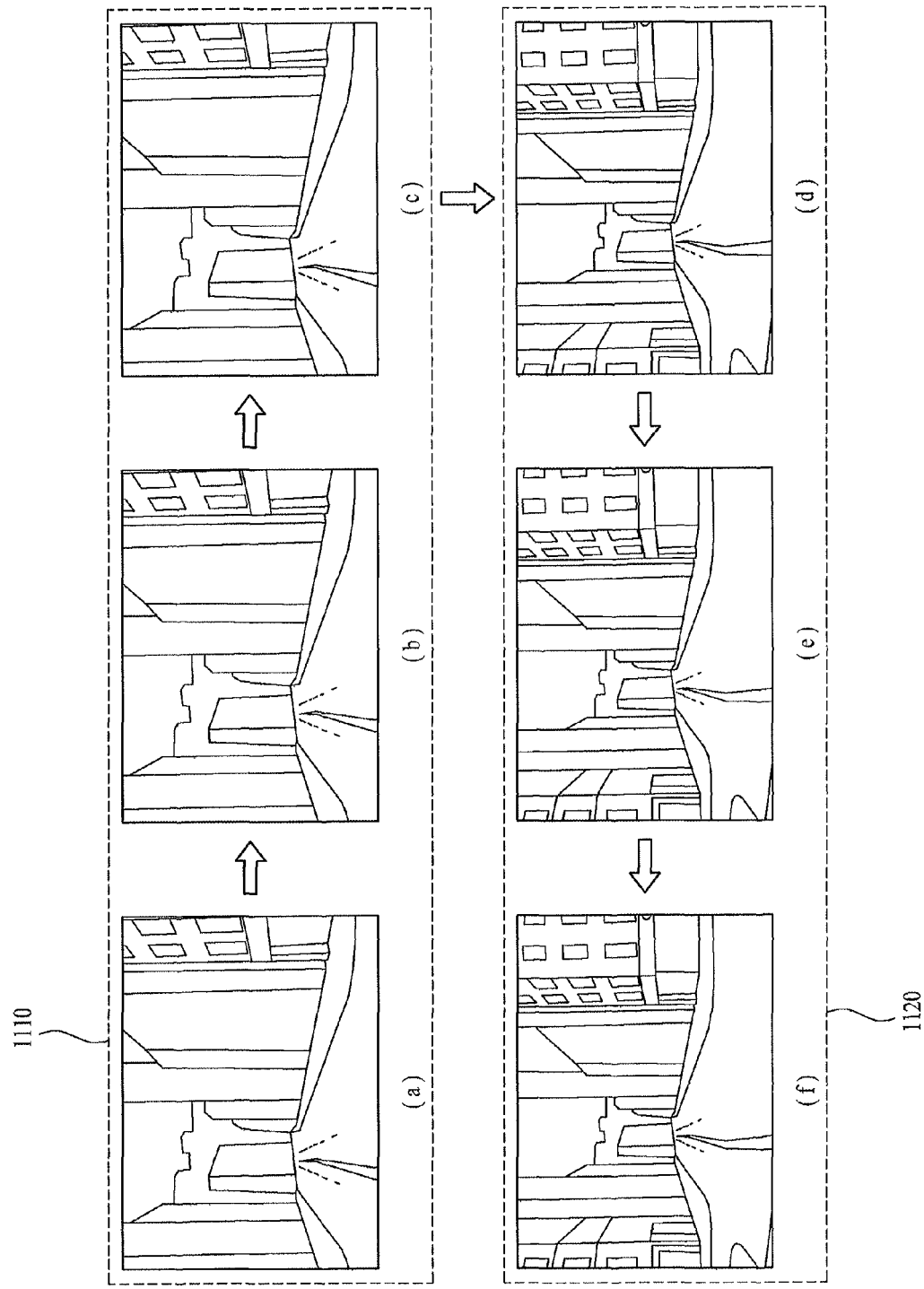
FIG. 11 illustrates a seventh exemplary case of displaying the recorded video in a horizontal display mode according to the embodiment of the present invention.

FIG. 11 illustrates an example of cropping each frame of the video in accordance with the crop area determined in FIG. 10 and resizing the cropped frames to fit the size of the original frame for each group. For example, the video display device may resize the cropped frames belonging to each group to fit the size of the respective original frames. Then, after combining the resized frames, the video display device may display the processed video. Accordingly, the video display device may display the video at diverse ratios without performing any zoom-in on the frames each having a variety of rotation angles within a single video.

Referring to FIG. 11, FIG. 11(*a*), FIG. 11(*b*), and FIG. 11(*c*) may correspond to Group A 1110. After being cropped based upon the crop area of FIG. 10(*c*), the frames of Group A 1110 may be resized to fit the size of the original frame. Additionally, FIG. 11(*d*), FIG. 11(*e*), and FIG. 11(*f*) may correspond to Group B 1120. After being cropped based upon the crop area of FIG. 10(*d*), the frames of Group B 1120 may be resized to fit the size of the original frame. FIG. 11(*a*) to FIG. 11(*f*) may correspond to frames being recorded by along a time sequence.

Meanwhile, as shown in FIG. 10, the cropping size of the frames shown in FIG. 10(*a*) to FIG. 10(*c*), i.e., Group A 1010, may be relatively smaller than the cropping size of the frames shown in FIG. 10(*d*) to FIG. 10(*f*), i.e., Group B 1020. Therefore, referring to FIG. 11, wherein the frames are cropped and resized, the frames shown in FIG. 11(*a*) to FIG. 11(*c*) may be displayed in a more zoomed-in state as compared to the frames shown in FIG. 11(*d*) to FIG. 11(*f*). Also, by viewing the frames displayed in FIG. 11, the user may not be capable of easily recognizing which frames have relatively greater rotation angles. Accordingly, in the horizontal display mode, the video display device may display an icon indicating the rotation information, so that the user can recognize the original video or be informed of the rotation angle of the original video. This will be described in more detail with reference to FIG. 14 and FIG. 15.

Accordingly, the video display device may not set up a single cropping size for the plurality of frames collectively. In this case, since the video display device can adjust and control the size of the crop area in accordance with various circumstances, the video display device can maintain the original video easily compared to perform rotation compensation collectively.

Figure 12:
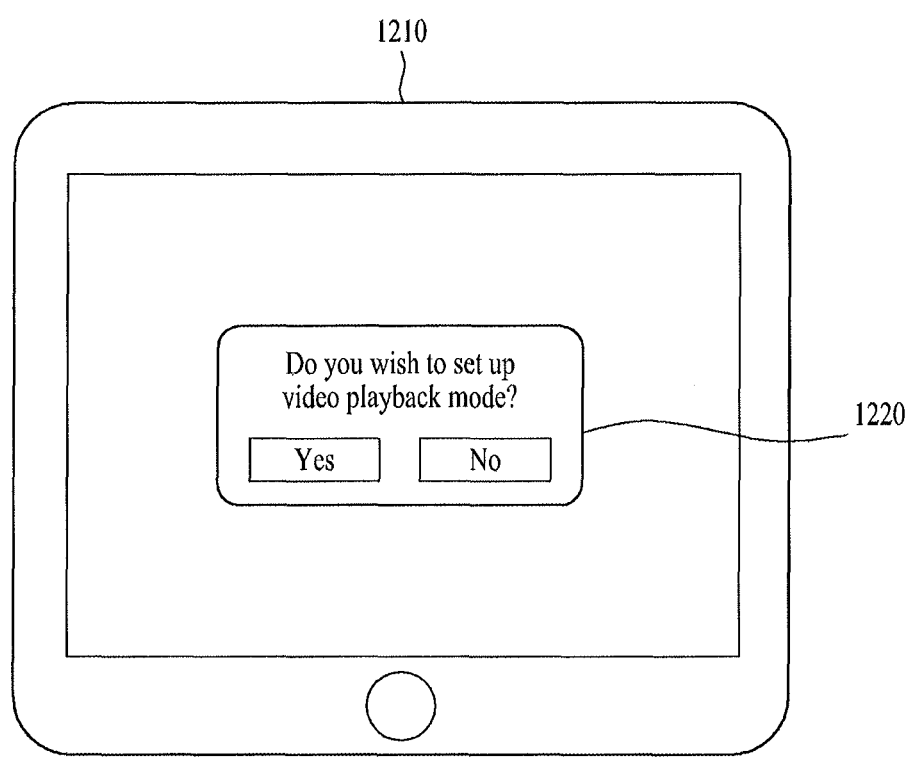
FIG. 12 illustrates an exemplary video playback mode set up interface according to an embodiment of the present invention.

FIG. 12 illustrates an exemplary video playback mode setup interface according to an embodiment of the present invention. More specifically, FIG. 12 illustrates an example of providing a video playback mode setup interface 1220, when displaying the video through the video display device 1210. For example, the video playback mode setup interface 1220 may be provided prior to the display of the video. In another example, the video playback mode setup interface 1220 may be provided when the video, which has already been in display, is stopped or paused.

Referring to FIG. 12, the video display device 1210 may provide the video playback mode setup interface 1220 to the user, so that the user can set up the video playback mode through a manual mode by the user's input or through a predetermined automatic mode. Herein, when the video playback mode of the video display device 1210 is set up by the manual mode, the user's input may be sensed by a sensor unit (not shown) included in the video display device. The user input may include input performed by the user's gesture, voice, touch, and so on. Moreover, the sensor unit (not shown) will be described in detail later on with reference to FIG. 16. Meanwhile, the video playback mode of the video display device 1210 can be set up by the automatic mode. Herein, when a rotation angle of a frame which has the maximum rotation angle among the plurality of frames of the video is identical to or exceeds a predetermined angle, the video display device 1210 may be set up to play-back the video in the horizontal display mode. Additionally, when a rotation angle of a frame which has the maximum rotation angle does not exceed the predetermined angle, the video display device 1210 may be set up to play-back the video in the natural display mode. However, the predetermined automatic mode may vary depending upon the settings. And, therefore, the present invention will not be limited only to the exemplary embodiment described above.

Referring to FIG. 12, when a 'yes' input is detected through the video playback mode setup interface 1220, the video display device 1210 may be set up to the manual mode. Alternatively, when a 'no' input is detected through the video playback mode setup interface 1220, the video display device 1210 may be set up to the predetermined automatic mode. The operations of the manual mode or the predetermined automatic mode will be described in detail with reference to FIG. 18. And, the set-up of the video playback mode will be described in more detail later on with reference to FIG. 17 to FIG. 19.

Figure 13:
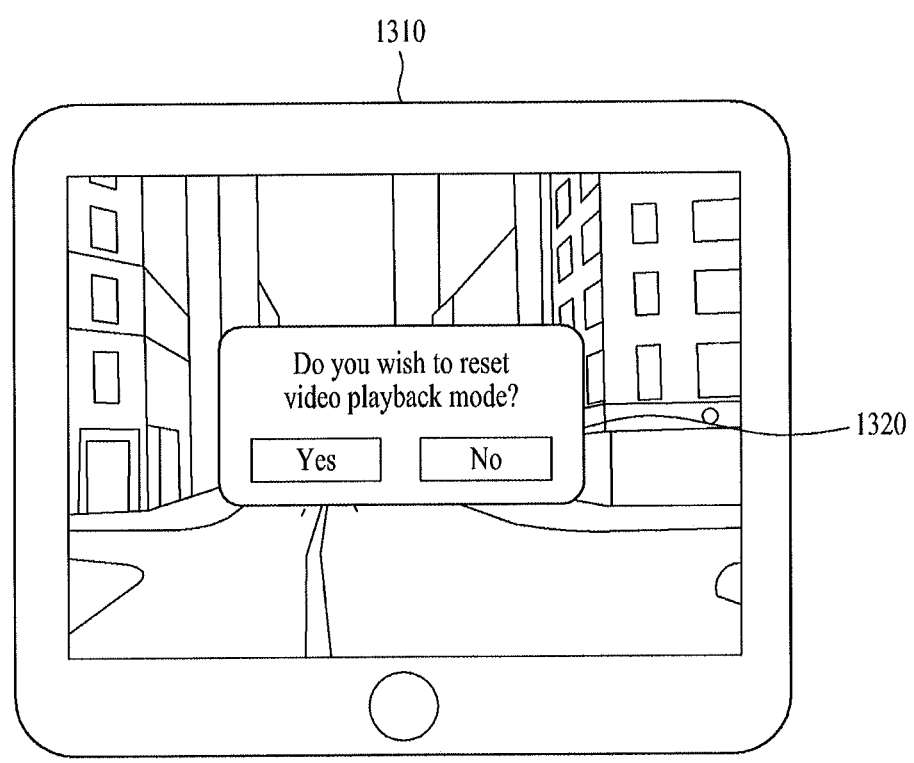
FIG. 13 illustrates an exemplary video playback mode reset up interface according to an embodiment of the present invention.

FIG. 13 illustrates an exemplary video playback mode re-set interface according to an embodiment of the present invention. More specifically, FIG. 13 illustrates an example of providing a video playback mode re-set interface 1320, when resetting the video playback mode while displaying a video through the video display device 1310.

Referring to FIG. 13, while displaying the video, when the video display device 1310 detects a user input, the video display device 1310 may provide the video playback mode re-set interface 1320 for resetting the video playback mode. Herein, the user's input may be sensed by a sensor unit (not shown) included in the video display device, and such user input may include input performed by the user's gesture, voice, touch, and so on. Moreover, the sensor unit (not shown) will be described in detail later on with reference to FIG. 16. In another example, while displaying the video in the natural display mode, when a frame of the video having a rotation angle that is identical to or exceeds the predetermined rotation angle is displayed during a time interval exceeding a predetermined time, the video display device 1310 may provide the video playback mode re-set interface 1320. Meanwhile, during the horizontal display, when the change in the rotation angle is not large, it may be more entertaining for the user to view the video in the natural display mode. Accordingly, while the video is being displayed in the horizontal display mode, when a frame of the video having a rotation angle that does not exceed the predetermined rotation angle is displayed during a time interval exceeding the predetermined time, the video display device 1310 may provide the video playback mode re-set interface 1320.

Referring to FIG. 13, when a 'yes' input is detected through the video playback mode re-set interface 1320 with respect to the resetting of the video playback mode, regardless of the initial video playback mode, the video display device 1310 may be set to reset the playback mode to a another video playback mode starting from the time point when the user input is detected. For example, in case the video display device 1310 has initially displayed in the natural display mode, when a 'yes' input is detected with respect to the resetting of the video playback mode, the video display device 1310 may display video in the horizontal display mode starting from the time point when the user input (i.e., 'yes' input) is detected. Alternatively, when a 'no' input is detected through the video playback mode re-set interface 1320 with respect to the resetting of the video playback mode, the video display device 1310 may set to maintain its initial playback mode. For example, in case the video display device 1310 has initially displayed in the natural display mode, when a 'no' input is detected with respect to the resetting of the video playback mode, the video display device 1310 may continue to be displayed in the natural display mode. Such video playback mode resetting will be described in more detail later on with reference to FIG. 20 and FIG. 21.

Meanwhile, when the video playback mode is being reset, the video may be displayed in the newly reset video playback mode of the video display device 1310 starting from the time point when the video playback is reset. Additionally, when the video playback mode is being reset, the playback mode of the entire video may be reset regardless of the resetting time point, so that the video display device 1310 can display the corresponding video in the reset playback mode. Accordingly, among the frames of the video, frames having smaller rotation angles may be zoomed-in less, and frames having larger rotation angles may be zoomed-in more. Thus, the user may be capable of viewing the video in more diverse viewing methods.

Figure 14:
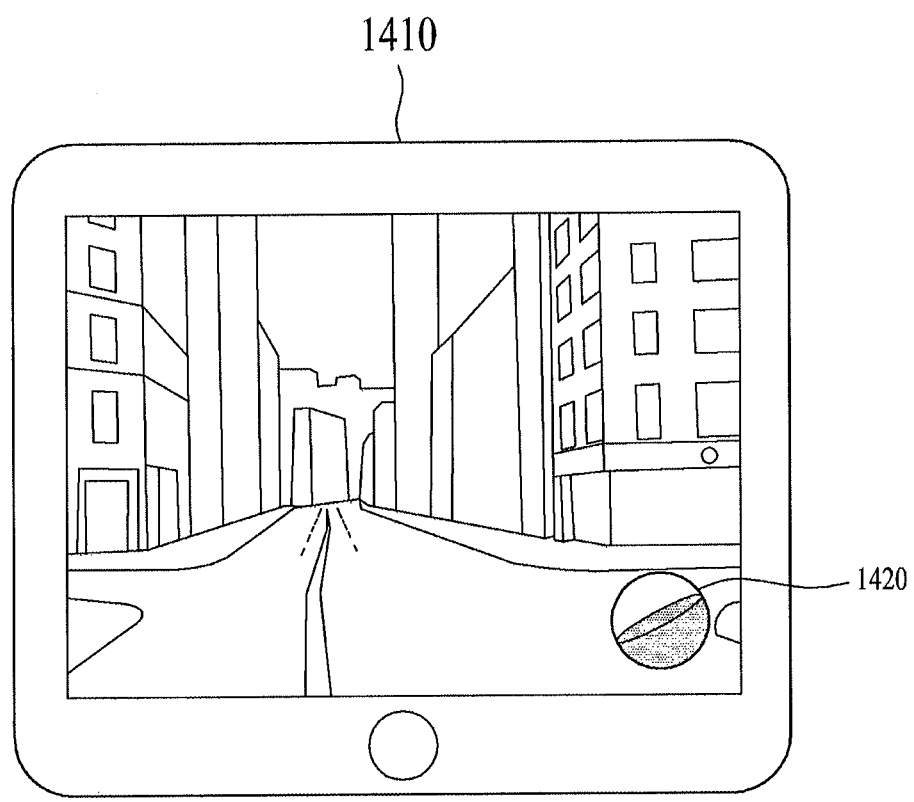
FIG. 14 illustrates an icon indicating the rotation information according to an embodiment of the present invention.

FIG. 14 illustrates an icon indicating the rotation information according to an embodiment of the present invention. More specifically, the video display device 1410 may display an icon 1420 indicating the rotation angle in a predetermined size and at a predetermined location. Such icon 1420 indicating the rotation angle may be displayed in the natural display mode or in the horizontal display mode. For example, the icon 1420 indicating the rotation angle may include a globe-like icon including a liquid substance. Herein, the liquid substance included in the globe-like icon may change in accordance with the rotation angle of the frame. And, the icon 1420 indicating the rotation angle may include a first indicator indicating a horizontal state and a second indicator indicating a tilted state with respect to the first indicator. For example, the icon 1420 indicating the rotation angle may consist of a straight line along the horizontal direction, which corresponds to the first indicator, and a straight line indicating a tilted angle, which corresponds to the second indicator.

Referring to FIG. 14, by using the icon 1420 indicating the rotation angle, it may be indicated to the user that the currently displayed frame has been recorded in a state rotated by 25° to the left (i.e., counter clockwise) with respect to the horizontal state. Additionally, the icon 1420 indicating the rotation angle may also include an icon (not shown) indicating a time order of the corresponding frame with respect to the overall frames of the video. Accordingly, during the display of the video the user may experience vividly that seems more real than the actual time of the recording of the video.

Figure 15:
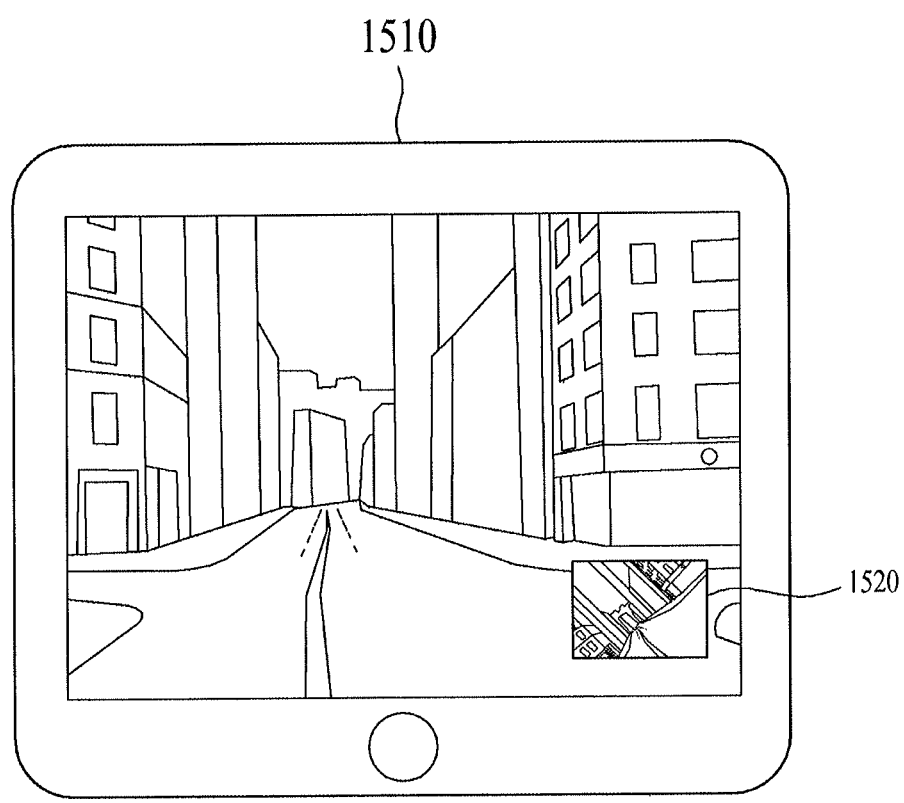
FIG. 15 illustrates an icon indicating the rotation information according to another embodiment of the present invention.

FIG. 15 illustrates an icon indicating the rotation information according to another embodiment of the present invention. More specifically, the video display device 1510 may display an icon 1520 indicating the rotation information, when the video playback mode is set to the horizontal display mode.

Referring to FIG. 15, the icon 1520 indicating the rotation information may include a display of a screen being displayed in the natural display mode. Referring to FIG. 15, the icon 1520 indicating the rotation information may be displayed in a rectangular shape at the lower right area of the video display device 1510. Additionally, in addition to the screen being displayed in the natural display mode, the icon 1520 indicating the rotation information may include an icon (not shown) indicating a time order of the corresponding frame with respect to the overall frames of the video. Accordingly, the user may be capable of viewing the video in a more stable state in the horizontal display mode, while experiencing vividly at the time of the recording of the video.

Figure 16:
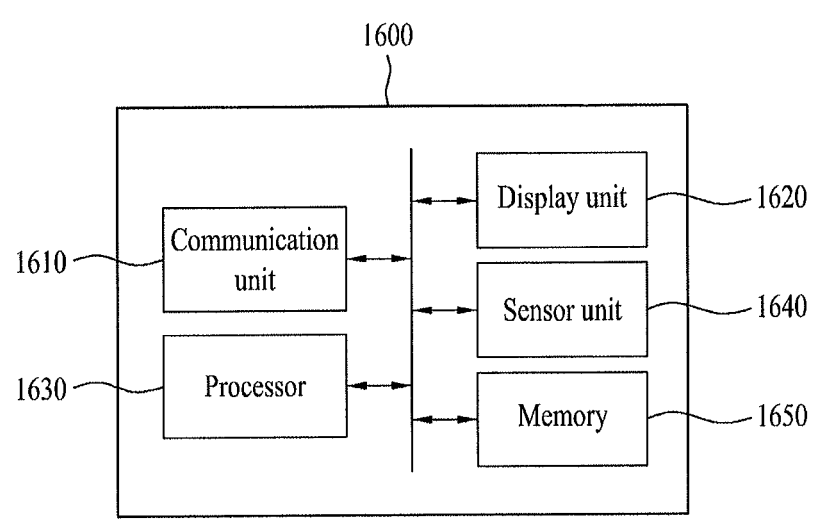
FIG. 16 illustrates a block view showing the structure of a video display device according to the present invention.

FIG. 16 illustrates a block view showing the structure of a video display device according to the present invention. As shown in FIG. 16, the video display device 1600 according to an exemplary embodiment of the present invention may include a communication unit 1610, a display unit 1620, a processor 1630, a sensor unit 1640, and a memory 1650.

First of all, the communication unit 1610 may perform communication with an external device (not shown) and diverse protocols, so as to transmit and/or receive data. Herein, the external device (not shown) may include an HMD, which is shown in FIG. 1. Additionally, the communication unit 1610 may access the external device (not shown) via wired or wireless communication, thereby being capable of transmitting and/or receiving digital data, such as contents. Moreover, the communication unit 1610 may transceive (i.e., transmit and receive) image, sound, and so on, with respect to the external device. In order to access a wired network, the communication unit 1610 may, for example, be equipped with an Ethernet terminal. Furthermore, in order to access a wireless network, the communication device 1610 may, for example, use diverse communication standards, such as Wireless LAN (WLAN) (or Wi-Fi), Wireless broadband (Wibro), World Interoperability for Microwave Access (Wimax), High Speed Downlink Packet Access (HSDPA), and so on.

The display unit 1620 outputs an image on a display screen. More specifically, the display unit 1620 may output a video based upon a control command of the processor 1630. More specifically, the display unit 1620 may display the video, which is acquired through the communication unit 1610, in a natural display mode or a horizontal display mode based upon the control command of the processor 1630.

The processor 1630 may execute diverse contents and applications and may process data within the display device 1600. Referring to FIG. 16, the processor 1630 may set-up a video playback mode for the video, which is acquired through the communication unit 1610. More specifically, the processor 1630 first decodes the video, which is encoded and provided by the external device. Additionally, as described above with reference to FIG. 4, the processor 1630 may setup the video playback mode to the natural display mode, which displays the decoded video without any further processing. Moreover, as described above with reference to FIG. 5 to FIG. 11, the processor 1630 may setup the video playback mode to the horizontal display mode, which displayed the video after performing rotation compensation, cropping, and resizing on the decoded video.

Also, as described above with reference to FIG. 12, the processor 1630 may provide a video playback mode set up interface, which may set up the video playback mode through a manual mode by the user's input or through a predetermined automatic mode. Additionally, as described above with reference to FIG. 13, while the video is being displayed, and when the use input has been detected, the processor 1630 may provide a video playback mode re-set interface, which may reset the video playback mode. Alternatively, as described above with reference to FIG. 13, while the video is being displayed, and when multiple frames exceeding a predetermined rotation angle are displayed during a time interval exceeding a predetermined time, the video display device 1600 may provide the video playback mode re-set interface. Meanwhile, as described above with reference to FIG. 14 and FIG. 15, the processor 1630 may set up the video display device 1600 to display an icon indicating rotation information of the multiple frames configuring the video. Furthermore, the operations that are performed by the processor 1630 will be described later on in more detail with reference to FIG. 17 to FIG. 21.

The sensor unit 1640 may sense diverse inputs of the user with respect to the display device 1600 and may sense the user's environment. The sensor unit 1640 may include multiple sensing means. Herein, the sensing means collectively refers to diverse sensing means including a touch sensor, an audio sensor, a video sensor, a Global Positioning System (GPS) sensor, a pressure sensor, a thermal sensor), a gravity sensor, a geomagnetic sensor, a motion sensor, a gyro sensor, an acceleration sensor, an infrared sensor, an inclination sensor, a brightness sensor, an altitude sensor, an odor sensor, a depth sensor, a bending sensor, an imaging sensor, and so on. Herein, the sensing means may sense diverse inputs of the user and the user's environment. More specifically, the sensor unit 1640 may sense a user input and may deliver the sensed user input to the processor 1630, so that the processor 1630 can set or reset the video playback mode.

The memory 1650 may be implemented by using an Electrically Erasable Programmable Read-Only Memory (EEPROM). And, in addition to the EEPROM, the memory 1650 may also include all types of storage unit storing or temporarily storing data. The memory 1650 may also store programs for processing and controlling each signal within the processor 1630, and the memory 1650 may also store signal-processed images, sounds, or data signals. Additionally, the memory 1650 may also perform the function of temporarily storing images, sounds, or data signals, which are inputted from the communication unit 1610 or the sensor unit 1640. Furthermore, the memory 1650 may store one or more applications or a list of applications being inputted from the communication unit 1610 or the sensor unit 1640.

Figure 17:
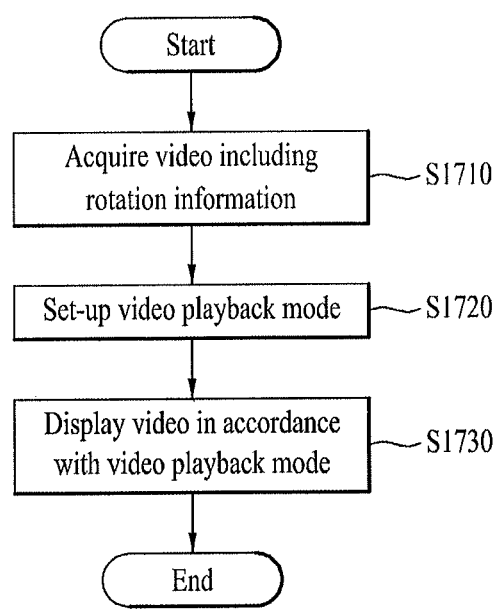
FIG. 17 illustrates a flow chart showing the process steps of a method of displaying a video according to a first embodiment of the present invention.

FIG. 17 illustrates a flow chart showing the process steps of a method of displaying a video according to a first embodiment of the present invention. Each process step of FIG. 17, which will hereinafter be described in detail, may be controlled by the processor 1630 of the display device 1600 shown in FIG. 16.

First of all, the video display device may acquire a video including rotation information (S1710). Accordingly, the video display device may acquire a video, which is recorded by an external device, or may acquire the video that is directly recorded by the video display device.

The video display device may set up a video playback mode (S1720). The video playback mode may include the natural display mode, which is described above with reference to FIG. 4, and the horizontal display mode, which is described above with reference to FIG. 5 to FIG. 11. Based upon the predetermined video playback mode, the video display device may display the corresponding video (S1730). The natural display mode may display the acquired video without performing a rotation compensation on the corresponding video. And, the horizontal display mode may display the video, which is rotation-compensated based upon the rotation information.

Figure 18:
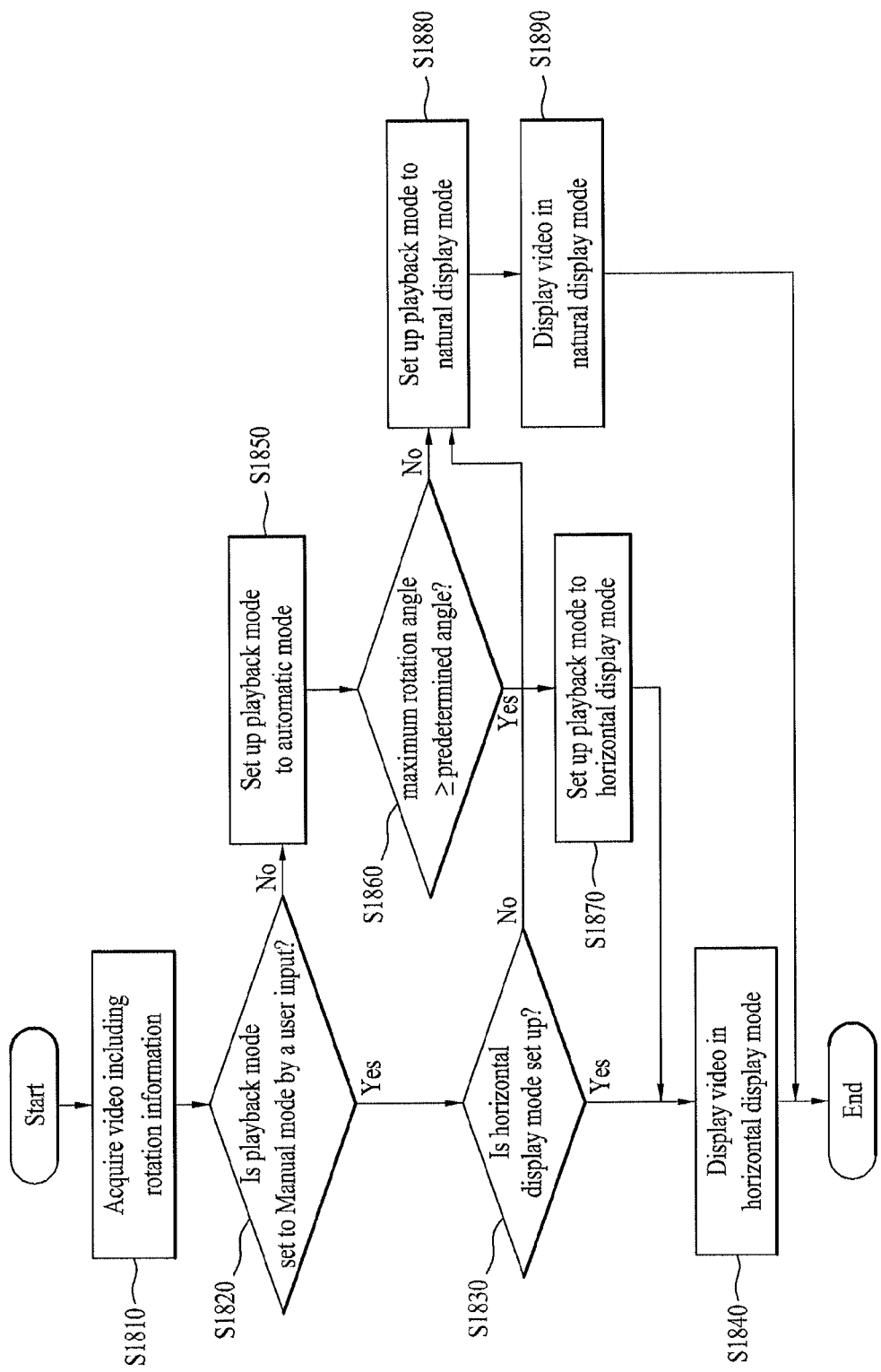
FIG. 18 illustrates a flow chart showing the process steps of a method of displaying a video according to a second embodiment of the present invention.

FIG. 18 illustrates a flow chart showing the process steps of a method of displaying a video according to a second embodiment of the present invention. Hereinafter, each process step described herein with reference to FIG. 18 may be controlled by the processor 1630 of the display device 1600, which is shown in FIG. 16. In the embodiment shown in FIG. 18, detailed description of the parts that are identical or similar to the embodiment shown in FIG. 17 will be omitted for simplicity.

First of all, the video display device may acquire a video including rotation information (S1810). Then, the video display device may decide whether or not to select the manual mode requiring user input as the video playback mode (S1820). The video display device may provide a video playback mode set up interface, which may set up the video playback mode through a manual mode requiring the user's input or through a predetermined automatic mode.

Figure 19:
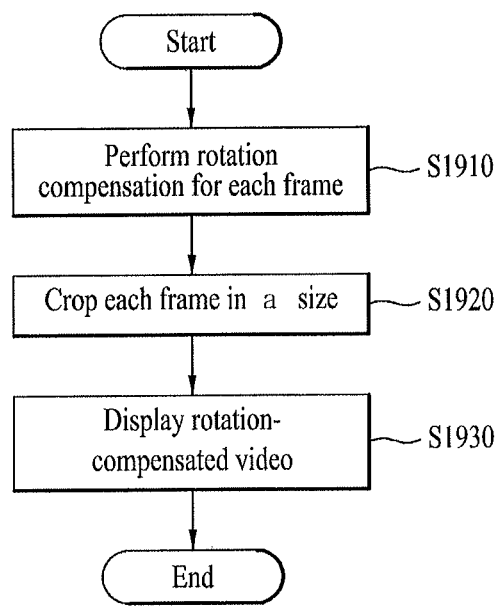
FIG. 19 illustrates a flow chart showing the process steps of the method of displaying a video shown in FIG. 18 in the horizontal display mode.

In step 1820, when the video playback mode is set to the manual mode, the video display device may provide a video playback mode set up interface for deciding whether or not to set up the video playback mode as the horizontal display mode (S1830). The video playback mode set up interface may be provided by the method, which is described above with reference to FIG. 14. In step S1830, when the video playback mode is set to the horizontal display mode, the video display device may display the video in the horizontal display mode (S1840). The operations for displaying the video in the horizontal display mode will be described in detail with reference to FIG. 19. Referring to FIG. 19, when the video playback mode is set to the horizontal display mode, the video display device may perform rotation compensation on the multiple frames of the video based upon the rotation information (S1910). More specifically, the video display device may decode the acquired video data, so as to acquire the frames that are to be displayed. Then, based upon the rotation angle information with respective to each frame, the corresponding frames may be rotation compensated. Additionally, step S1910 may be performed by using the methods described above with reference to FIG. 3 to FIG. 9.

With respect to the rotation-compensated frames, the video display device may crop multiple frames to a size (S1920). More specifically, step S1920 may be realized by the method, which is described above with reference to FIG. 5 or FIG. 11. Herein, among the multiple frames of the video, the cropping size may be decided based upon a frame substantially having a minimum crop area size according to the rotation compensation. Additionally, based upon the rotation information, the frame corresponding to the crop area substantially having the minimum size can be a frame corresponding to the cropped area substantially having a maximum size for the horizontal display.

Moreover, the video display device may combine and display the cropped frames (S1930). More specifically, the video display device may resize each of the cropped frames to the size of the frame included in the recorded video, and then, the video display device may combine and display the resized frames. Furthermore, step S1930 may be realized by the method, which is described above with reference to FIG. 7 or FIG. 11.

Meanwhile, in step S1820, when it is determined that the video playback mode will not be set to the manual mode, the video display device may set up the video playback mode to the automatic playback mode (S1850). When the video display device sets up the video playback mode to the automatic playback mode, the video display device may decide whether the maximum rotation angle of the plurality of frames of the video is identical to or exceeds a predetermined angle (S1860). Among the rotation angles of the multiple frames, when the maximum rotation angle is equal to or exceeds the predetermined angle, the video display device may be set to the horizontal display mode (S1870). In case the video display mode is set to the horizontal display mode, the video display device may display the video in the horizontal display mode (S1840). The process step S1840 may be performed by using the method, which is described above with reference to FIG. 19.

Meanwhile, in step S1860, when the maximum rotation angle of the multiple frames does not exceed the predetermined angle, the video display device may be set to the natural display mode (S1880). Accordingly, the video display device may display the recorded video in the natural display mode without performing any rotation compensation (S1890). Additionally, in step S1830, when it is decided by the user input that the video playback mode will not be set up as the horizontal display mode, the video display device may be set to the natural display mode (S1880). In this case, as described above, the video display device may display the recorded video in the natural display mode without performing any rotation compensation (S1890).

Figure 20:
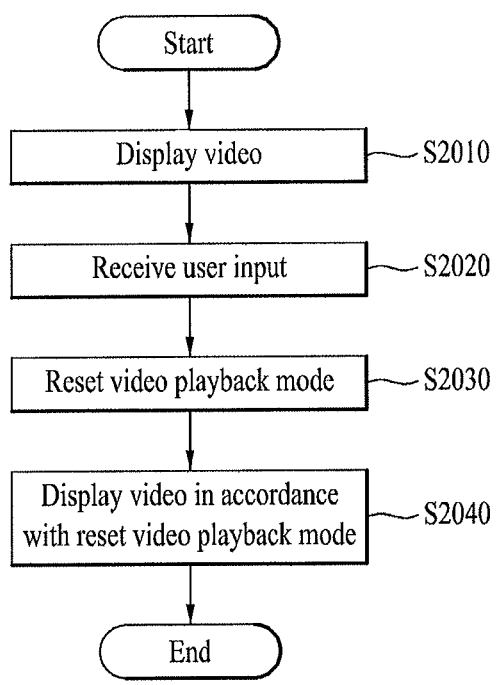
FIG. 20 illustrates a flow chart showing the process steps of a method of displaying a video according to a third embodiment of the present invention.

FIG. 20 illustrates a flow chart showing the process steps of a method of displaying a video according to the present invention. Hereinafter, each process step described herein with reference to FIG. 20 may be controlled by the processor 1630 of the display device 1600, which is shown in FIG. 16. Additionally, FIG. 20 illustrates a flow chart showing the process steps of the method of resetting the video display mode by using the user's input during the display of the video.

First of all, the video display device displays the video in the set video playback mode (S2010). More specifically, in accordance with the initially set video playback mode, the video display device may playback the video in the natural display mode or the horizontal display mode.

During the display of the video, the video display device may receive a user input (S2020). The user input may include a gesture or voice of the user. For example, during the display of the video in the natural display mode, due to a significant change in the rotation angle of the video, the video display device may receive a user input from the user wishing to view the corresponding video in the horizontal display mode. In another example, during the display of the video in the horizontal display mode, the video display device may receive a user input from the user wishing to view the corresponding video vividly. Herein, the user input may be sensed by the sensor unit 1640, which is shown in FIG. 16.

Based upon the received user input, the video display device may reset the video playback mode (S2030). More specifically, based upon the input of the user wishing to change the natural display mode, which was initially set as the video display mode, the video playback mode of the video display device may be reset from the natural display mode to the horizontal display mode. For example, based upon the input of the user wishing to change the horizontal display mode, which was initially set as the video display mode, the video playback mode of the video display device may be reset from the horizontal display mode to the natural display mode.

In accordance with the reset video playback mode, the video display device may display the corresponding video (S2040). For example, the video display device may reset the video playback mode with respective to the frames after the point of resetting the video playback mode and may display corresponding frames in the reset display mode. In another example, regardless of the point of resetting the video playback mode, the video display device may reset the video playback mode with respect to the entire video and may display the video accordingly.

Figure 21:
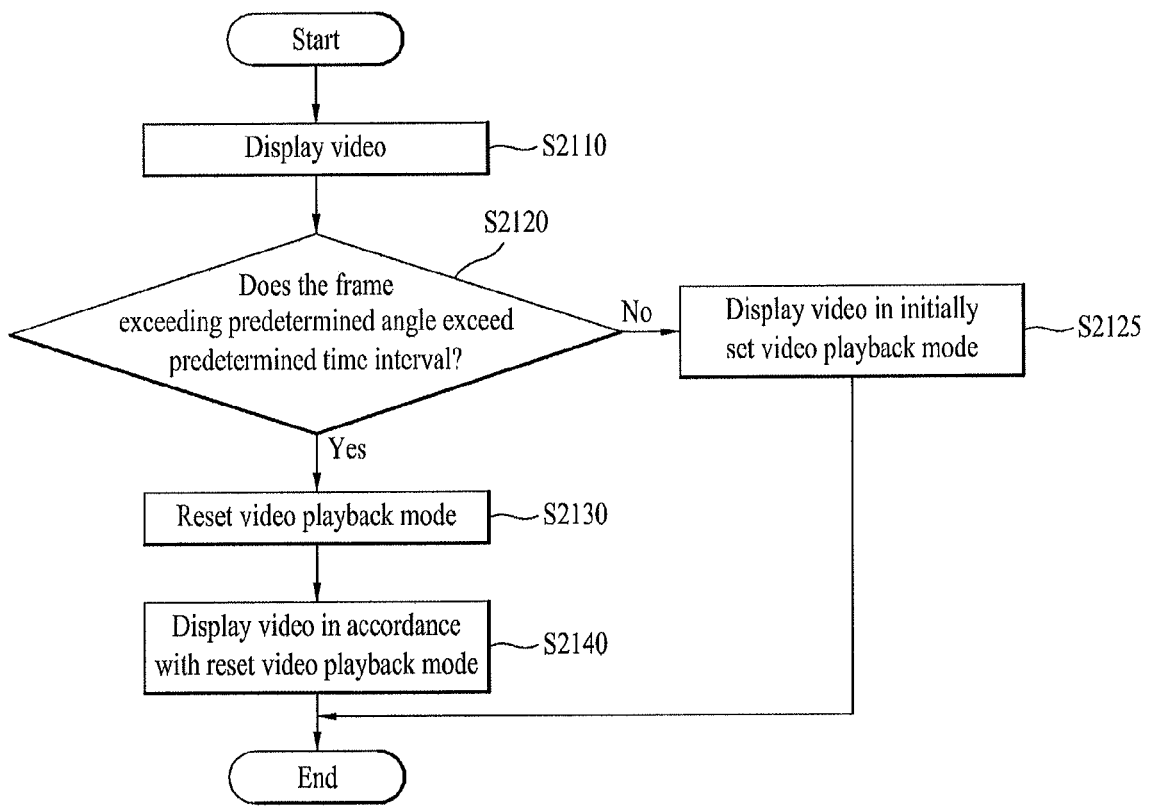
FIG. 21 illustrates a flow chart showing the process steps of a method of displaying a video according to a fourth embodiment of the present invention.

FIG. 21 illustrates a flow chart showing the process steps of a method of displaying a video according to a fourth embodiment of the present invention. Hereinafter, each process step described herein with reference to FIG. 21 may be controlled by the processor 1630 of the display device 1600, which is shown in FIG. 16. Additionally, FIG. 21 illustrates a flow chart showing the process steps of the method of resetting the video display mode by using the predetermined automatic mode during the display of the video. In the embodiment shown in FIG. 21, detailed description of the parts that are identical or similar to the embodiment shown in FIG. 20 will be omitted for simplicity.

First of all, the video display device displays the video in the set video playback mode (S2110). More specifically, in accordance with the initially set video playback mode, the video display device may playback the video in the natural display mode or the horizontal display mode.

During the display of the video, the video display device may determine whether or not a frame exceeding the predetermined angle is continuously displayed while exceeding a predetermined time interval (S2120). When the frame exceeding the predetermined angle is determined to be displayed without exceeding the predetermined time interval, the video display device may continue to display the corresponding video in the initially set video playback mode (S2125). For example, during the display of the video in the natural display mode, when the frame exceeding the predetermined angle is displayed without exceeding the predetermined time interval, the video display device may continue to display the corresponding video in the natural display mode. Meanwhile, in addition to the above-described embodiment of the present invention, the present invention may also include another exemplary embodiment of automatically resetting the video playback mode.

Meanwhile, in step S2120, when the frame exceeding the predetermined angle is determined to be continuously displayed while exceeding the predetermined time interval, the video display device may reset the initially set video playback mode (S2130). For example, during the display of the video in the natural display mode, when the frame exceeding the predetermined angle is determined to be continuously displayed while exceeding the predetermined time interval, the video playback mode may be reset from the natural display mode to the horizontal display mode.

And, the video display device may display the video, based upon the reset video playback mode (S2140).

Furthermore, although the drawings have been distinguished and divided in order to facilitate the description of the present invention, the present invention may be designed to form a new embodiment by combining some of the above-described embodiments of the present invention. Moreover, whenever required by anyone skilled in the art, the scope of the present invention includes designing a recording medium readable by a computer, the computer having a program for executing the above-described embodiments of the present invention recorded therein.

The video display device and the method of displaying a video according to the present invention may not be limited only to the above-described configuration and methods according to the exemplary embodiments of the present invention. Accordingly, variations of the exemplary embodiments of the present invention may be configured by selectively combining each exemplary embodiment of the present invention fully or in part.

Meanwhile, the video displaying method according to the present invention may be realized as a code that can be read by a processor provided in the image display device in a recording medium that can be read by a processor. The recording medium that can be read by the processor includes all types of recording devices storing data that can be read by the processor. Examples of the recording media that can be read by a processor may include ROMs, RAMS, magnetic tapes, floppy disks, optical data storing devices, and so on. Also, an exemplary recording medium being realized in the form of a carrier wave, such as a transmission via Internet, may also be included. Also, the recording medium that can be read by a processor may be scattered within a computer system, which is connected through a network. And, a code that can be read by the processor may be stored and executed by using a dispersion method.

As described above, the display device and the method of displaying a video may have the following advantages. According to the embodiment of the present invention, the natural display mode and the horizontal display mode may both be available for a single video, and the user may be capable of simultaneously experiencing the live on-site sensation at the time of the recording of the corresponding video through the shaking of the screen displayed via natural display and the stable display of the image displayed via horizontal display.

Additionally, according to the embodiment of the present invention, by using an icon indicating the rotation information, which is displayed during the display of the selected video, the user may be capable of experiencing vividly at the time of the recording. Furthermore, according to the embodiment of the present invention, by using a video playback set-up or reset interface, the user may easily switch the playback modes, thereby enhancing user convenience.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents. It is also apparent that such variations of the present invention are not to be understood individually or separately from the technical scope or spirit of the present invention.

Also, a device invention and a method invention are both described in this specification of the present invention. Therefore, whenever required, the description of both inventions may be supplementarily applied.

What is claimed is:

1. A video display device for displaying a recorded video by a head mounted display, the video display device comprising:
    a communicator configured to acquire a video including rotation information that indicates a rotation angle of a plurality of frames of the video recorded from the head mounted display, wherein the rotation information is acquired while the head mounted display is worn by a user;
    a display configured to display the video; and
    a processor configured to set up a video playback mode,
    wherein the video playback mode includes a natural display mode for displaying the acquired video without performing a rotation compensation based upon the rotation information, and a horizontal display mode for displaying the acquired video with performing the rotation compensation based upon the rotation information,
    wherein, when the video playback mode corresponds to the horizontal display mode, the video display device performs the rotation compensation of a plurality of sequential frames of the video based upon the rotation information, and displays each of the plurality of sequential frames having the performed rotation compensation of the video and cropped to a size,
    wherein, when a frame corresponds to a predetermined angle range is displayed while exceeding a predetermined time interval during the display of the video, the video display device displays a playback mode reset interface configured to reset the set video playback mode,
    wherein the cropping size is determined based upon the rotation information of the plurality of sequential frames of the video,
    wherein the cropping size is decided based upon a frame having a minimum crop area, among the plurality of frames of the video, based upon the rotation information, and
    wherein the rotation angle is an angle rotating around a front-to-back axis.

2. The video display device of claim 1, wherein the rotation compensation of the processor, based upon the rotation information, rotates the plurality of sequential frames of the video in an opposite direction of the rotation angle as much as a size of the rotation angle.

3. The video display device of claim 1, wherein the cropping size is determined based further upon an aspect ratio of the plurality of frames of the video.

4. The video display device of claim 1, wherein the processor provides a playback mode set-up interface configured to set up the video playback mode in accordance with a manual mode by a user input or a predetermined automatic mode.

5. The video display device of claim 4, wherein, when the video playback mode is set up in accordance with the predetermined automatic mode, when a rotation angle of a frame having a maximum rotation angle among the plurality of frames of the video exceeds a predetermined angle, the video is displayed in the horizontal display mode, and, when the rotation angle of a frame having a maximum rotation angle among the plurality of frames of the video does not exceed the predetermined angle, the video is displayed in the natural display mode.

6. The video display device of claim 1, wherein the rotation information includes information on a change in the rotation angles of the plurality of frames of the video.

7. The video display device of claim 1, wherein the processor displays the video based upon the set video playback mode, among the plurality of frames of the video, with respect to frames positioned after a time point at which the video playback mode is being set up.

8. The video display device of claim 1, wherein the processor displays the video based upon the set video playback mode, with respect to all of the frames of the video.

9. The video display device of claim 1, wherein, when a user input is detected during the display of the video, the processor further provides a playback mode reset interface configured to reset the set video playback mode.

10. The video display device of claim 4, wherein the user input includes a voice input, a gesture input, or a touch input.

11. The video display device of claim 1, wherein the processor displays an icon indicating rotation information of the plurality of frames of the video.

12. The video display device of claim 11, wherein the icon indicating the rotation information includes an indicator indicating a horizontal direction, and an indicator indicating a rotation angle.

13. The video display device of claim 1, wherein, when the video playback mode corresponds to the horizontal display mode, the processor resizes the plurality of cropped frames and displays the resized frames.

14. The video display device of claim 1, wherein the processor divides the plurality of frames of the video into a plurality of frame groups based upon a predetermined standard, and sets up the video playback mode for each frame group of the plurality of frame groups.

15. The video display device of claim 14, wherein the processor divides the plurality of frames of the video into the plurality of frame groups based upon a changing point of a scene, and
wherein the changing point of a scene is determined based upon a change occurring before and after a frame.

16. A method of displaying a recorded video by a head mounted display, the method comprising:
acquiring a video including rotation information that indicates a rotation angle of the plurality of frames of the video recorded from the head mounted display, wherein the rotation information is acquired while the head mounted display is worn by a user;
setting up a video playback mode,
wherein the video playback mode includes a natural display mode for displaying the acquired video without performing a rotation compensation based upon the rotation information, and a horizontal display mode for displaying the acquired video with performing the rotation compensation based upon the rotation information; and
displaying the video based upon the set video playback mode,
wherein, when the video playback mode corresponds to the horizontal display mode, a plurality of sequential frames of the video is rotation-compensated based upon the rotation information, and each of the sequential frames having the performed rotation compensation of the video are cropped to a size, thereby being displayed;
displaying a playback mode reset interface to reset the set video playback mode when a frame corresponds to a predetermined angle range is displayed while exceeding a predetermined time interval during the display of the video,
wherein the cropping size is determined based upon the rotation information of the plurality of sequential frames of the video,
wherein the cropping size is decided based upon a frame having a minimum crop area, among the plurality of frames of the video, based upon the rotation information, and
wherein the rotation angle is an angle rotating around a front-to-back axis.

17. In a video display device displaying a recorded video by a head mounted display, the video display device comprising:
a communicator configured to acquire a video including rotation information that indicates a rotation angle of the plurality of frames of the video recorded from the head mounted display, wherein the rotation information is acquired while the head mounted display is worn by a user;
a display configured to display the video; and
a processor configured to set up a video playback mode,
wherein the video playback mode includes a natural display mode for displaying the acquired video without performing a rotation compensation based upon the rotation information, and a horizontal display mode for displaying the acquired video with performing the rotation compensation based upon the rotation information,
wherein, when the video playback mode corresponds to the horizontal display mode, the video display device performs the rotation compensation of a plurality of sequential frames of the video based upon the rotation information, and displays each of the plurality of sequential frames having the performed rotation compensation of the video and cropped to a size,
wherein, when a frame corresponds to a predetermined angle range is displayed while exceeding a predetermined time interval during the display of the video, the video display device displays a playback mode reset interface configured to reset the set video playback mode,
wherein a cropping size is decided based upon the rotation information of the plurality of sequential frames of the video,
wherein, with the exception for at least one frame having a minimum crop area among the plurality of frames of the video, the cropping size is decided based upon a frame among the remaining frames having a minimum crop area in accordance with the rotation compensation, and
wherein the rotation angle is an angle rotating around a front-to-back axis.

* * * * *